US011632024B2

(12) United States Patent
Chmelicek et al.

(10) Patent No.: US 11,632,024 B2
(45) Date of Patent: Apr. 18, 2023

(54) PERMANENT MAGNET ROTOR ASSEMBLY

(71) Applicant: ROMAX TECHNOLOGY LIMITED, Cobham (GB)

(72) Inventors: Petr Chmelicek, Nottingham (GB); Ashish Goel, Nottingham (GB); Marek Jacubaszek, Nottingham (GB)

(73) Assignee: ROMAX TECHNOLOGY LIMITED, Cobham (GB)

( * ) Notice: Subject to any disclaimer, the term of this patent is extended or adjusted under 35 U.S.C. 154(b) by 1044 days.

(21) Appl. No.: 16/142,007

(22) Filed: Sep. 26, 2018

(65) Prior Publication Data
US 2019/0103791 A1 Apr. 4, 2019

(30) Foreign Application Priority Data

Oct. 3, 2017 (GB) ..................................... 1716140
Feb. 28, 2018 (GB) ..................................... 1803269

(51) Int. Cl.
*H02K 15/03* (2006.01)
*H02K 1/27* (2022.01)
(Continued)

(52) U.S. Cl.
CPC ............. *H02K 15/03* (2013.01); *H02K 1/272* (2013.01); *H02K 1/2713* (2013.01); *H02K 1/2773* (2013.01)

(58) Field of Classification Search
CPC .......... H02K 15/03; H02K 15/02; H02K 1/27; H02K 1/2713; H02K 1/272; H02K 1/274;
(Continued)

(56) References Cited

U.S. PATENT DOCUMENTS 4,481,437 A 11/1984 Parker
6,462,449 B1 * 10/2002 Lucidarme ........... H02K 21/048
310/156.56
(Continued)

FOREIGN PATENT DOCUMENTS

CN 102761211 A 10/2012
CN 102761220 A * 10/2012
(Continued)

OTHER PUBLICATIONS

K. Atallah and J. Wang: A rotor with axially and circumferentially magnetized permanent magnets, IEEE Transactions on Magnetics, Nov. 2012.
(Continued)

*Primary Examiner* — Edgardo San Martin
(74) *Attorney, Agent, or Firm* — Maschoff Brennan

(57) ABSTRACT

Construction of a permanent magnet rotor assembly having a plurality of magnetic poles and comprising a number of magnetic pole pieces arranged in circular array. Two sets of permanent magnets—one set magnetised in circumferential direction of the rotor and the second set providing flux in axial direction of rotor, generating a magnetic flux focused through the pole piece and interacting with the magnetic flux of the stator. End-plates made of magnetic material are present such there is an axial gap between the them and the array of magnetic pole pieces. Circumferentially magnetised magnets are placed in the circumferential gaps between the pole pieces, whereas the magnets providing flux in axial direction are placed in the gaps between the array of pole pieces and end-plates.

13 Claims, 21 Drawing Sheets

(51) Int. Cl.
  *H02K 1/2713* (2022.01)
  *H02K 1/272* (2022.01)
  *H02K 1/276* (2022.01)

(58) Field of Classification Search
  CPC .. H02K 1/2753; H02K 1/2766; H02K 1/2773; H02K 21/12
  See application file for complete search history.

(56) References Cited

U.S. PATENT DOCUMENTS

| | | | | |
|---|---|---|---|---|
| 8,432,080 | B2* | 4/2013 | Murakami | H02K 1/2766 310/156.43 |
| 9,667,111 | B2* | 5/2017 | Kim | H02K 1/278 |
| 11,005,321 | B2* | 5/2021 | Chmelicek | H02K 1/2786 |
| 2004/0004407 | A1 | 1/2004 | Laurent et al. | |
| 2006/0061227 | A1 | 3/2006 | Heideman et al. | |
| 2009/0009022 | A1 | 1/2009 | Saint-Michel | |
| 2013/0043754 | A1 | 2/2013 | Zhu et al. | |
| 2013/0134820 | A1 | 5/2013 | Zhu et al. | |
| 2013/0241335 | A1 | 9/2013 | Vollmer | |
| 2014/0210294 | A1* | 7/2014 | Wakita | H02K 1/2773 310/156.07 |
| 2016/0365763 | A1 | 12/2016 | Sakurai et al. | |
| 2017/0019004 | A1 | 1/2017 | Dajaku | |
| 2017/0098971 | A1* | 4/2017 | Kobayashi | H02K 1/2753 |

FOREIGN PATENT DOCUMENTS

| | | | |
|---|---|---|---|
| DE | 10 2009 026288 A1 | 2/2011 | |
| DE | 10-2013-225238 A1 | 6/2015 | |
| DE | 10-2016-110872 A1 | 12/2016 | |
| EP | 1 416 617 A1 | 5/2004 | |
| EP | 1416618 A1 * | 5/2004 | H02K 1/2713 |
| EP | 1416618 A1 | 5/2004 | |
| JP | S59-72968 A | 4/1984 | |
| JP | 2007-282325 A | 10/2007 | |
| SU | 1541712 A1 * | 2/1990 | |
| WO | WO-8401676 A1 * | 4/1984 | H02K 1/2773 |

OTHER PUBLICATIONS

Matsuhashi et al.: Comparison study of various motors for EVs and the potentiality of a ferrite magnet motor, The 2014 International Power Electronics Conference, Hiroshima, Dec. 20, 2014.

* cited by examiner

PERMANENT MAGNET ROTOR ASSEMBLY

BACKGROUND OF THE INVENTION

The present invention is related to permanent magnet motors.

A concept of two dimensionally flux focused radial field rotor for an electrical machine was disclosed by K. Atallah and J. Wang (A rotor with axially and circumferentially magnetized permanent magnets, IEEE Transactions on Magnetics, November 2012). The concept utilizes two sets of magnets, one set providing flux in circumferential direction and the other in axial direction. Magnetic flux generated by both sets of magnets is guided towards the electrical machine air gap by magnetic pole pieces. Additionally, magnetic end-plates are utilized to provide return path for the flux travelling in axial direction. Due to the aforementioned two-dimensional flux focusing, air gap flux density could be substantially higher than remanent flux density of permanent magnets employed in the rotor. A similar concept was disclosed by Matsuhashi et al. (Comparison study of various motors for EVs and the potentiality of a ferrite magnet motor, The 2014 International Power Electronics Conference, Hiroshima, 2014). Additionally, Yaskawa Denki Seisakusho KK (CN102761220 (A): Magnet-embedded rotary motor, 2012 Oct. 31) describe a similarly looking rotor topology, the main difference being in the end-plates which are made of non-magnetic material. In this arrangement, axially magnetized magnets are utilized to limit axial leakage rather than to aid flux focusing. Mitsubishi Electric Corporation (US2017098971 (A1): Rotor for permanent magnet motor, 2017 Apr. 6) disclosed a radial field rotor concept with a circular array of poles and permanent magnets supplying magnetic flux in axial direction while possibility of adding circumferentially magnetised magnets is described. Mabuchi Motor Co. (US2014210294 (A1): Rotor and Motor, 2014 Jul. 31) show a rotor including a single piece rotor core and plurality of magnets held in holding sections formed radially. The N-poles and S-poles are formed alternatively in the circumferential direction. They also include auxiliary magnets on the end face of the rotor core magnetized in axial direction. EP1416618 discloses a special type of synchronous machine with hybrid excitation where an excitation coil mounted on the stator is necessary in order to achieve the rotor excitation required for operation. The above mentioned references use the basic concept of flux focusing through the pole pieces and there are a number of problems with this type of rotor, as discussed in the following paragraphs.

The magnetic flux from the two sets of magnets are oriented in circumferential and axial directions. When the flux is focused into the pole pieces, it is directed in the radial direction towards the air gap between rotor and stator. So, the path of magnetic flux within each pole piece and other magnetic materials is three dimensional. Hence, it is beneficial if magnetic properties of all parts of the rotor magnetic circuit have isotropic properties. Additionally, power loss of electromagnetic nature, particularly due to flow of eddy currents in solid bodies, could be present in electrically conductive parts of the rotor. Eddy currents are induced by space harmonics of air gap magnetic fields moving asynchronously with respect to the rotor and maybe generated by stator slotting for instance. Ensuring isotropic properties and limiting power loss at the same time is challenging.

Permanent magnets could be partially or fully demagnetised by external fields or when overloaded by high reluctance magnetic circuit. This can happen during normal operation or under fault conditions and is of particular concern when cheap magnets with low coercive force are used. Rotor design employing low coercive force magnets able to resist demagnetisation is difficult to achieve.

Effectiveness of flux focusing is dependent on minimisation of magnetic flux leakage. Leakage flux in an electrical machine is a portion of flux which does not contribute to electromechanical energy conversion, is normally considered parasitic. Structural components of the rotor, having relative permeability higher than air, could exacerbate this problem while components made of non-magnetic materials could be substantially more expensive. Some non-magnetic materials are not stable under mechanical or thermal stress.

Structural integrity is a problem as multiple components are held together and undergo radial, axial and circumferential loads. The scale of this challenge increases with the operating speed of the rotor. Further, due to the small air gap between rotor and stator, the radial expansion of the rotor must also be minimised. The radial expansion of the rotor could be as a result of stretching and yielding of components. Some of the components, such as permanent magnets, have inherently poor mechanical properties.

The present invention includes a set of features in the components of the rotor and specific arrangements through which the above-mentioned problems are solved. The embodiments shown provide a mechanically robust design while not compromising electromagnetic performance.

The permanent magnet rotor assembly presented in this document is a novel concept employing two-dimensional flux focusing, making it possible to achieve high air gap flux densities in electrical machines equipped with this rotor despite using magnets with low remanent flux density. Consequently, low cost materials such as ferrites can be employed instead of high-performance rare earth based permanent magnets which are currently prevalent but suffer from supply chain issues and are substantially more expensive. Electrical machines equipped with this rotor show potential to achieve similar efficiency and power density to rare earth based electrical machines, and improved performance over current state-of-the-art (SoA) non-rare earth technologies. Because of this, the presented rotor technology is particularly suitable for applications where high performance, low cost and robustness is required. Additionally, stable supply of ferrite magnets enables relatively low risk high volume production. Due to all these benefits, the invention has the potential to accelerate wide spread adoption of environmentally friendly technologies. Among applications which are most likely to benefit from the presented invention are reduced or zero emission automotive traction and renewable power generation.

BRIEF SUMMARY OF THE INVENTION

In order to solve the above problems and achieve the object, an aspect of the present invention is two dimensionally flux focused rotor assembly having mechanical connection between electromagnetically active components and shaft allowing for transfer of torque to or from system in which it is integrated. In addition, magnetic flux leakage is minimised by either omitting components providing leakage path or by employing non-magnetic materials. Presented solutions also improve demagnetisation resistance of permanent magnets and minimize power loss of electromagnetic nature. Furthermore, features and components improving mechanical robustness of the rotor are introduced.

According to an aspect of the present invention, there is provided a permanent magnet rotor assembly having a plurality of magnetic poles, comprising the following components: a plurality of magnetic pole pieces arranged in circular array, the magnetic pole pieces having circumferential gaps between them; an array of circumferentially magnetised magnets placed in the circumferential gaps wherein the circumferentially adjacent magnets are magnetised in opposite directions to each other; magnetic end-plates having an axial position with respect to the circular array of magnetic pole pieces so that an axial gap exists between each magnetic end-plate and the magnetic pole pieces; circular arrays of magnets providing flux in an axial direction placed in the axial gaps wherein circumferentially adjacent magnets in each array are magnetised in opposite directions to each other; a shaft used to transmit torque between the rotor and a prime-mover in generation mode and between the rotor and a load in motor mode; and a flux barrier region having high magnetic reluctance between the (i) shaft and (ii) the magnetic pole pieces and the arrays of magnets; wherein one of the end-plates and the corresponding array of magnets providing flux in an axial direction are located at each end of the rotor assembly; and wherein the magnetic end-plates connect the shaft to the rest of the rotor assembly. Among advantages of the disclosed invention is utilisation of two independent arrays of permanent magnets together with magnetic pole pieces creating flux focused rotor structure. Magnetic end-plates serve both structural purpose, in transmitting torque between the shaft and the rest of the rotor assembly, and magnetic purpose in providing return path for the flux from the magnets providing flux in axial direction. Common issue of flux leakage at the inner diameter of the rotor is addressed by the flux barrier region which substantially reduces leakage and allows the shaft to be made of inexpensive mild steel having high relative permeability. In the disclosed structure, pole piece to pole piece and pole piece to end-plate leakage is minimized due to the fact that there is no magnetically conductive connection between them. Advantageously, the present invention, unlike some prior art inventions, does not rely on external sources of magnetic excitation and can be used in conjunction with any conventional synchronous machine stator.

According to another aspect of the present invention, there is provided an electrical machine comprising: a cylindrical stator having a winding comprising a number of coils; a rotor assembly as disclosed above; a power supply providing electrical energy to the stator windings. An electrical machine equipped with the rotor as disclosed in this document will be able to match performance of state of the art motors at reduced cost

BRIEF DESCRIPTION OF THE SEVERAL VIEWS OF THE DRAWING

The present invention will now be described, by way of example only, with reference to the accompanying drawings, in which.

DETAILED DESCRIPTION OF THE INVENTION

Figure 1A:
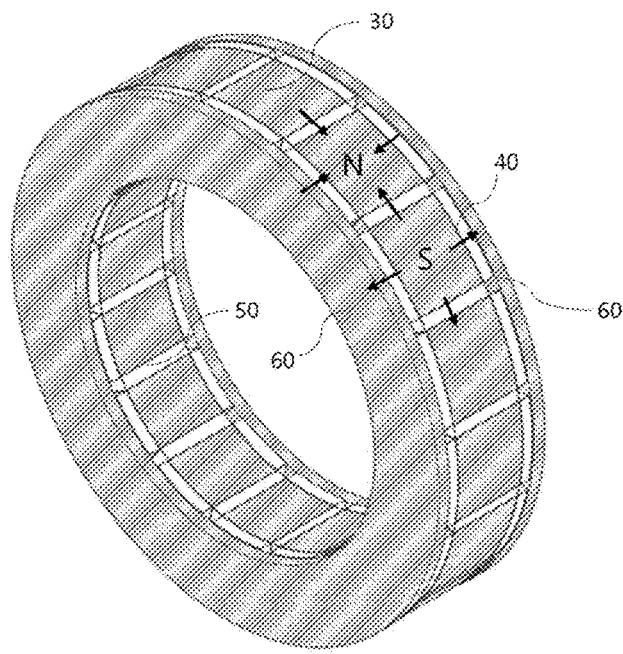
FIG. 1a shows assembled view of fundamental (active) components of the two dimensionally flux focused permanent magnet rotor in which arrows depict the direction of magnetisation of permanent magnets.
Figure 1B:
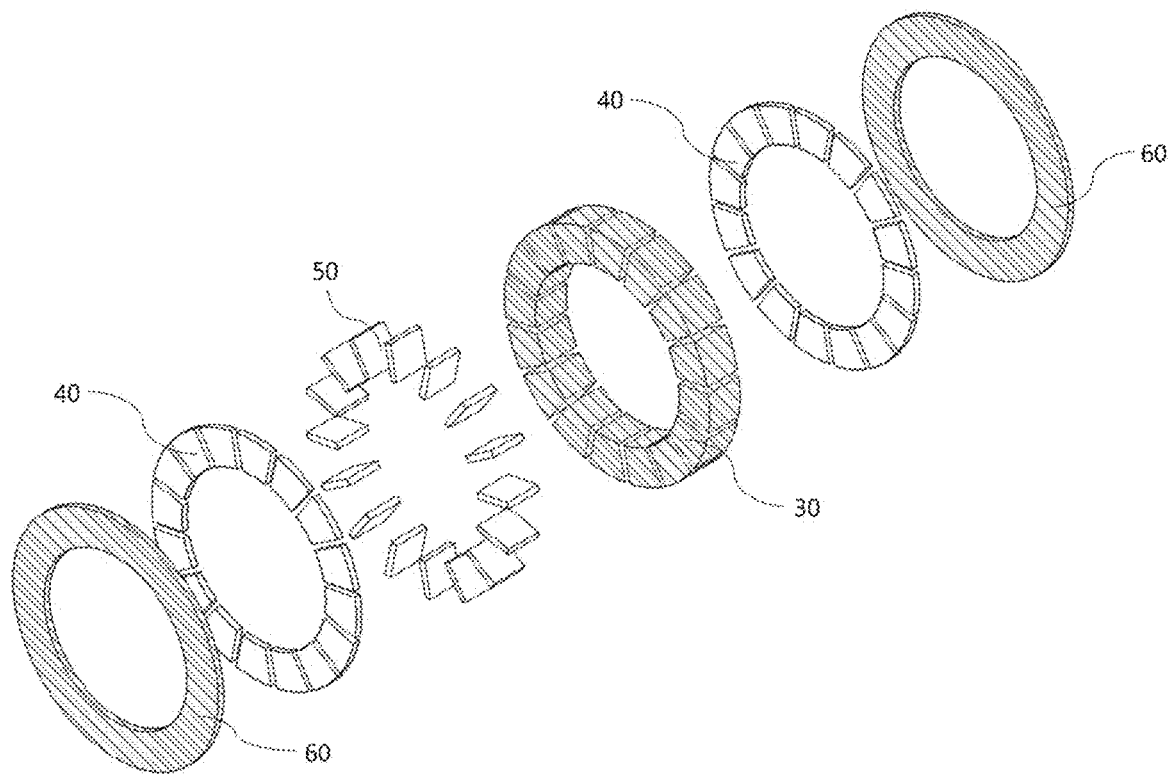
FIG. 1b shows exploded view of fundamental (active) components of the two dimensionally flux focused permanent magnet rotor.
Figure 2:
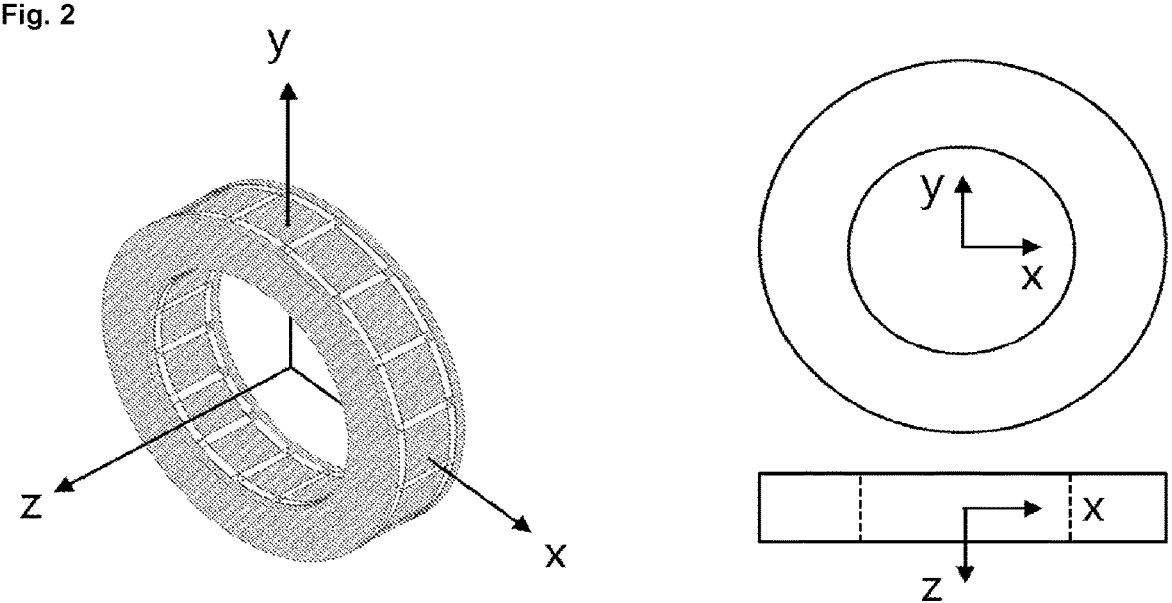
FIG. 2 depicts the cartesian coordinate system for the rotor which is used as reference in the following figures and in the detailed description of embodiments.

Referring to FIG. 1a and FIG. 1b, which respectively show an assembled and exploded view of the fundamental components of the permanent magnet rotor and a co-ordinate system used in the following description of the embodiments, a general arrangement of a permanent magnet rotor for an electrical machine employing two dimensional flux focusing is disclosed. The direction of magnetisation for the magnets is shown by arrows in FIG. 1a.

Fundamental (active) components of the permanent magnet rotor are magnetic pole pieces 30, magnetic end-plates 60, circumferentially magnetised magnets 50 and magnets providing flux in axial direction 40. Within each array of circumferentially magnetised magnets 50 and magnets providing flux in axial direction 40, the circumferentially adjacent magnets are magnetised in opposite directions to each other. Within each array, there is one magnet corresponding to each pole piece. The magnetic end-plates 60 and the magnetic pole pieces 30 are magnetically insulated from each other by the magnets providing flux in axial direction 40, which have high magnetic reluctance.

Magnetic pole pieces 30 guide magnetic flux provided by the circumferentially magnetised magnets 50 and magnets providing flux in axial direction 40, towards the air gap between the permanent magnet rotor and a stator. Each magnetic pole piece 30 creates either north or south pole. Consequently, magnetic pole pieces 30 with isotropic magnetic properties are beneficial due to three dimensional flux path. In addition, they ought to be constructed so that eddy current losses induced in the magnetic pole pieces 30 by asynchronous air gap fields (fields rotating at different speed than the permanent magnet rotor itself) are minimized. Furthermore, magnetic pole pieces 30 can provide mechanical constraint to adjacent magnets.

Magnetic end-plates 60 provide path for magnetic flux generated by magnets providing flux in axial direction 40 and, therefore, need to be made of magnetic material. Isotropic magnetic properties of material used for the end-plates are beneficial. As is the case with magnetic pole pieces 30, varying magnetic field could induce eddy currents in the magnetic end-plates 60, therefore they need to be constructed so that the eddy current loss is minimized. Magnetic end-plates 60 can also provide mechanical constraint to adjacent magnets and couple the shaft to the rest of the permanent magnet rotor assembly. Additionally, thickness of the magnetic end-plates 60 must be such that magnetic flux passing through them won't cause excessive saturation of the material.

Circumferentially magnetised magnets 50 and magnets providing flux in axial direction 40 are the main source of excitation for the permanent magnet rotor. Direction of magnetisation for north N and south S pole are indicated by arrows (FIG. 1a). As mentioned earlier, the permanent magnet rotor employs two dimensional flux focusing. Flux focusing is a method of increasing air gap magnetic flux density generated by a permanent magnet rotor. In case of the presented arrangement, appropriately sized circumferentially magnetised magnets 50 and magnets providing flux in axial direction 40 can achieve high flux density in the magnetic pole pieces 30 and consequently, in the air gap. Air gap flux density can be significantly higher than remanent flux density of the magnets 40,50. Because of this, inexpensive magnets with low remanent flux density can be used (such as ferrites). In addition, the proposed permanent magnet rotor could be equipped with high remanent flux density magnets, such as NdFeB and SmCo, resulting in significant reduction of magnet volume compared to conventional rare earth rotor.

In case the material used for permanent magnets 40,50 is conductive, the magnets need to be constructed so that eddy current loss and subsequent heating of the permanent magnet rotor is minimized.

Leakage flux (i.e. the portion of flux which doesn't directly contribute to electromechanical energy conversion and does not cross the air gap between the rotor and stator) is typically required to be minimal. For this reason, the flux barrier region is preferably adjacent, or substantially adjacent, to the inner diameter of the pole pieces, circumferentially magnetised magnets and the magnets providing flux in axial direction and extending towards the radial centre of the rotor. The flux barrier region comprises air or components made of solid materials having relative magnetic permeability equal or close to 1. Magnetic reluctance of the flux barrier region must be larger than reluctance of the air gap between the rotor and stator in order to be effective at preventing loss of useful flux due to flux leakage.

Figure 4A:
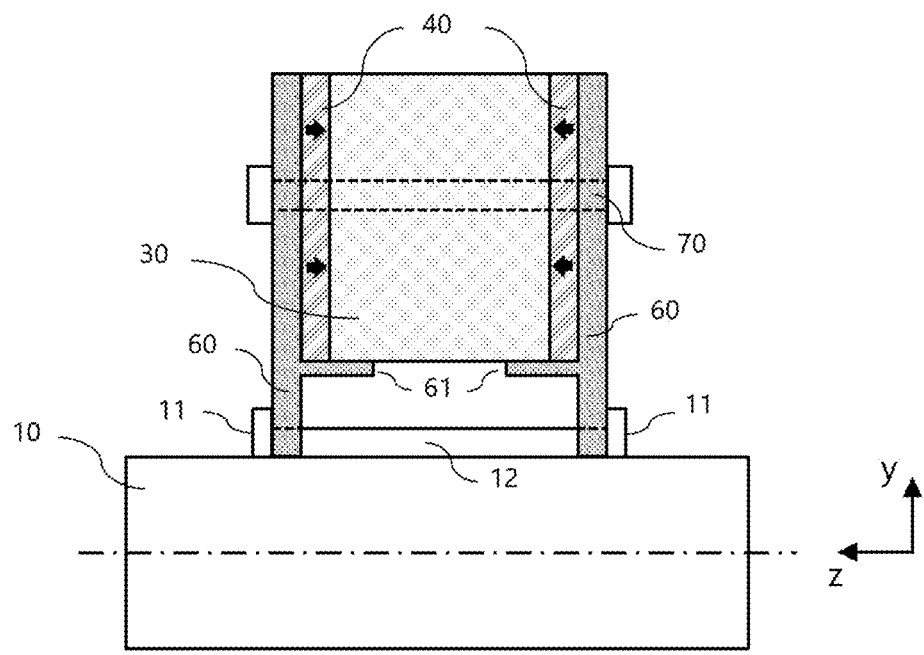
FIG. 4a is a view of the permanent magnet rotor cut along the z-axis and through the magnetic pole piece showing the shaft, magnetic pole piece, magnets providing flux in axial direction, magnetic end-plates and axial fastener.

FIG. 4a shows an embodiment of the present invention without the hub and comprises shaft 10, magnetic pole piece 30, magnets providing flux in axial direction 40 and magnetic end-plates 60.

Magnetic end-plates 60 with inner radius extending to shaft 10 having shoulders 11 to provide axial tightness to the magnetic end-plates 60 and hence constraining the other components. These magnetic end-plates 60 are made with ferromagnetic material having isotropic magnetic properties to provide return path for the magnetic flux generated by magnets providing flux in axial direction 40.

Important aspect to note here is the absence of rotor hub and the magnetic end-plates 60 are used to provide structural support between the shaft 10 and magnetic pole pieces 30 as well as the 10 magnets providing flux in axial direction 40.

Absence of parts made of magnetic material near the inner diameter of magnetic pole pieces 30 and magnets is beneficial since it reduces loss of magnetic flux due to leakage through the magnetic components. As a result, more of the useful flux is directed towards the air gap adjacent to stator which improves electromagnetic performance of a machine equipped with such permanent magnet rotor. In this embodiment, magnetic pole pieces 30 and magnets providing flux in axial direction 40 are mechanically constrained by magnetic end-plates 60 leaving large gap between them and the shaft 10. The gap acts as a flux barrier region with high magnetic reluctance and the larger it is the more effective it will be at reducing flux leakage. As a result, magnetic properties of the material used for the shaft 10 are of less importance.

Figure 4B:
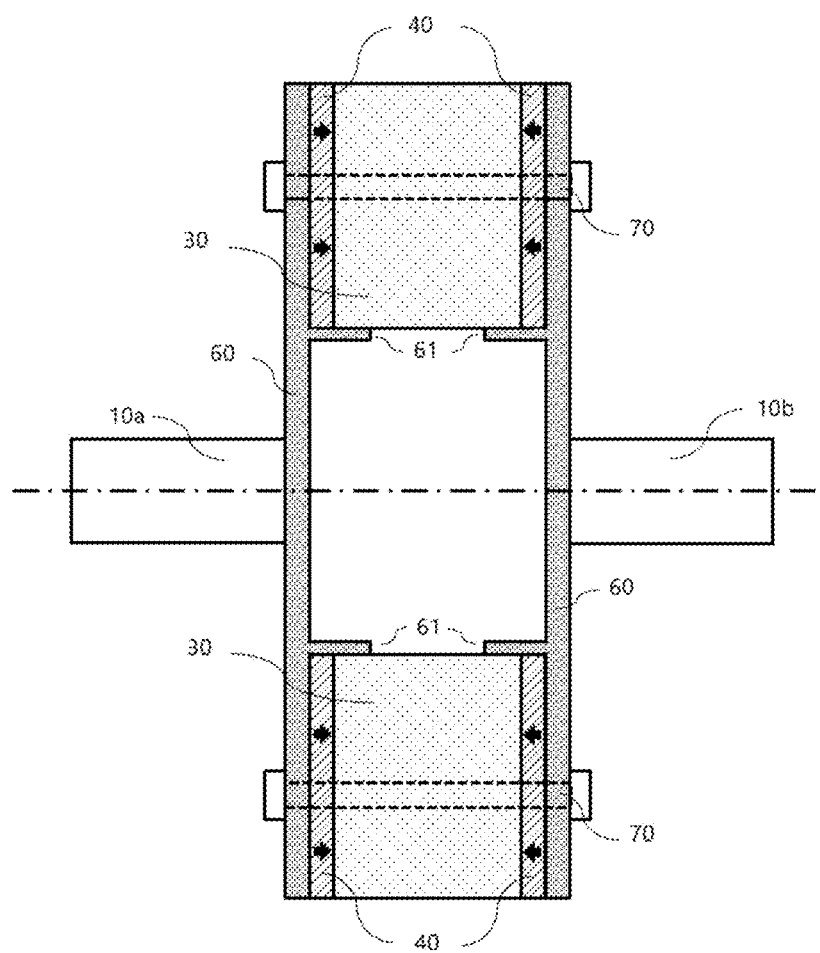
FIG. 4b is a view of the permanent magnet rotor cut along the z-axis and through the magnetic pole pieces showing magnetic pole pieces, magnets providing flux in axial direction, magnetic end-plates and axial fastener, and in which the shaft components on the two sides connect the end-plates directly.

This configuration can also be constructed by using two separate shaft components 10a and 10b as shown in FIG. 4b such that the shaft components 10a and 10b connect directly to the magnetic end-plates 60 on the respective sides. Using this modification. the gap between magnetic components is further increased. Consequently, this modification further reduces the loss of magnetic flux due to leakage through the magnetic components.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity such as engineering plastic can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 would need to be strong enough to provide axial tightness of active components of the permanent magnet rotor.

An axial extension (lip) 61 is made at an intermediate diameter of the pole-facing side of magnetic end-plates 60 to provide support to magnetic pole pieces 30 and magnets providing flux in axial direction 40 at their inner diameter. This lip provides radial support to magnetic pole pieces 30 and magnets providing flux in axial direction 40 and constrains them against rotation around the axial fastener 70. This lip can also work as a placement aide for magnetic pole pieces 30, circumferentially magnetised magnets 50 and magnets providing flux in axial direction 40. Both of these constraints are against light forces and hence the lip 61 need not be very strong. The centrifugal forces act outward, which is already supported by the axial fastener 70. This lip 61 can be eliminated if more than one axial fastener 70 is used, which can also help distributing the stress. Lips 61 on magnetic end-plates 60 made of magnetic material in close proximity to magnets could increase flux leakage. However, radial thickness of lips can be designed so that the magnetic material becomes saturated by small amount of leakage flux and its relative permeability approaches that of air. Trade-off between mechanical rigidity and amount of leakage flux it can carry exists.

A spline 12 type feature on the shaft 10 with the corresponding feature on the magnetic end-plates 60 for the circumferential constraint resulting in transfer of torque to the shaft 10. For the two-shaft construction shown in FIG. 4*b*, the shaft component 10*a* and the end-plate 60 on the side of shaft component 10*a* can be connected together or they can form an integral member. Similarly, the shaft component 10*b* and the end-plate 60 on the side of shaft component 10*b* can be connected together or they can form an integral member.

A shoulder 11 type feature on the shaft 10 for axial placement of the active components. This feature is not required for the two-shaft construction shown in FIG. 4*b*.

An adhesive can be used at the interface between components to keep the assembly intact against centrifugal and axial forces.

Figure 5A:
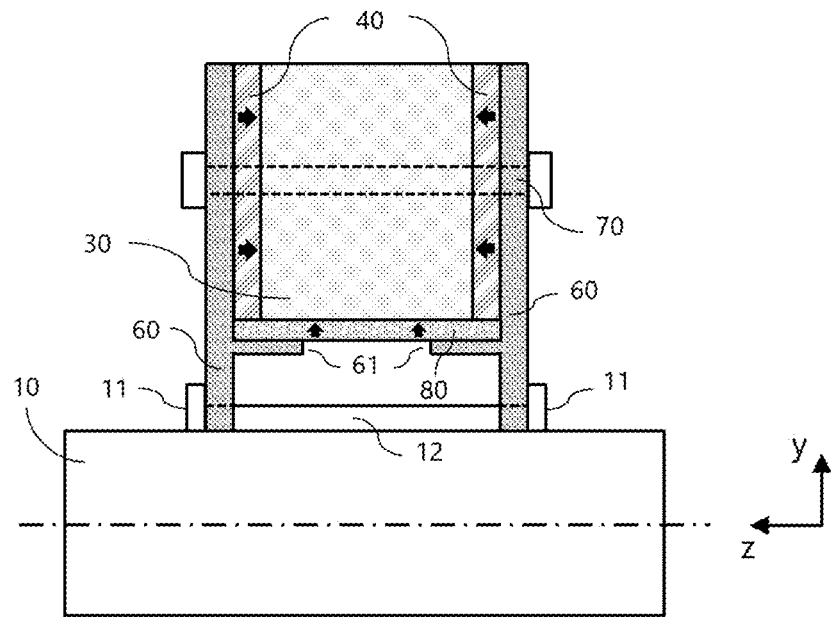
FIG. 5a is a view of the permanent magnet rotor cut along the z-axis and through the magnetic pole piece, showing the shaft, magnetic pole piece, magnets providing flux in axial direction, magnetic end-plates, spacer and axial fastener.

FIG. 5*a* shows another hubless embodiment having shaft 10, magnetic pole piece 30, magnets providing flux in axial direction 40, magnetic end-plates 60 and a spacer 80 made of non-magnetic material or permanent magnet.

Magnetic end-plates 60 with inner radius extending to shaft 10 having shoulders 11 to provide axial tightness to the magnetic end-plates 60 and hence constraining the other components. These magnetic end-plates 60 are made with ferromagnetic material having isotropic magnetic properties to provide return path for the magnetic flux generated by magnets providing flux in axial direction 40.

Important aspect to note here is the absence of rotor hub where the magnetic end-plates 60 are used to provide structural support between the shaft 10 and pole pieces 30 as well as magnets providing flux in axial direction 40. Absence of parts made of magnetic material near the inner diameter of magnetic pole pieces 30 and magnets is beneficial since it reduces loss of magnetic flux due to leakage through the magnetic components. As a result, more of the useful flux is directed towards the air gap adjacent to stator which improves electromagnetic performance of a machine equipped with such permanent magnet rotor. In this embodiment, magnetic pole pieces 30 and magnets providing flux in axial direction 40 are mechanically constrained by magnetic end-plates 60 leaving large gap between them and the shaft 10. The gap acts as a flux barrier with high magnetic reluctance and the larger it is the more effective it will be at reducing flux leakage. As a result, magnetic properties of the material used for the shaft 10 are of less importance.

Figure 5B:
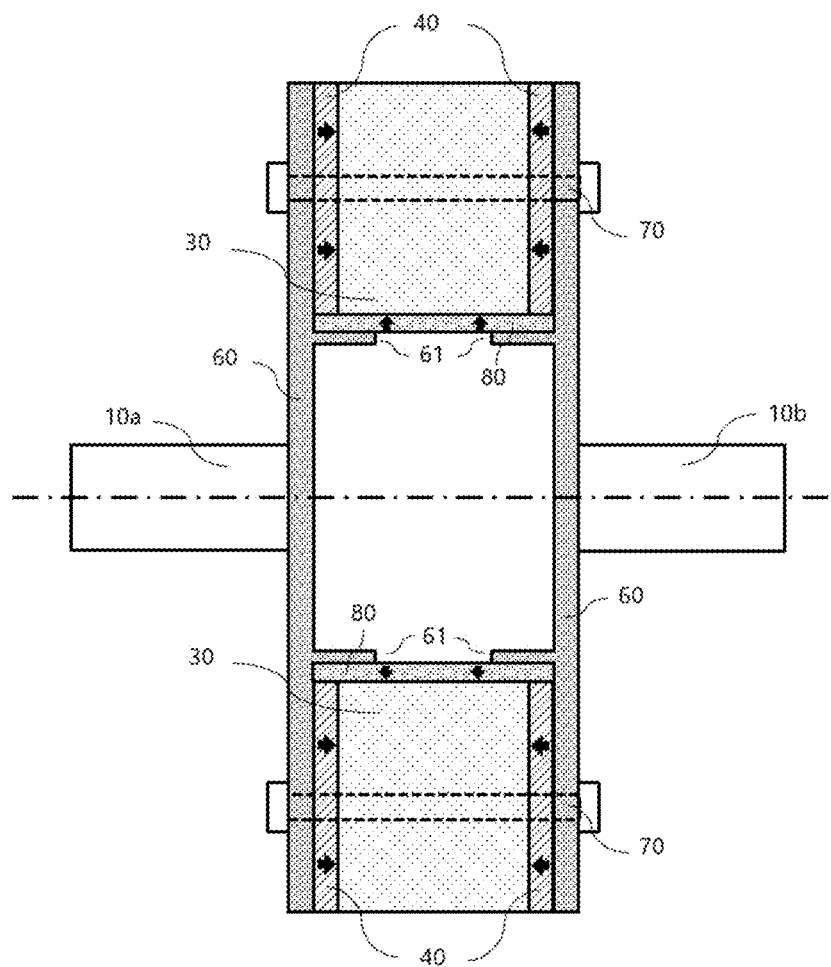
FIG. 5b is a view of the permanent magnet rotor cut along the z-axis and through the magnetic pole piece showing magnetic pole pieces, magnets providing flux in axial direction, magnetic end-plates, spacer and axial fastener, in which the shaft components on the two sides connect the end-plates directly.

This configuration can also be constructed by using two separate shaft components 10*a* and 10*b* as shown in FIG. 5*b* such that the shaft components 10*a* and 10*b* connect directly to the magnetic end-plates 60 on the respective sides. Using this modification. the gap between magnetic components is further increased. Consequently, this modification further reduces the loss of magnetic flux due to leakage through the magnetic components.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 would need to be strong enough to provide axial tightness of active components of the permanent magnet rotor.

An axial extension (lip) 61 is made at the pole-facing side of magnetic end-plates 60 to provide support to magnetic pole pieces 30 and magnets providing flux in axial direction 40. This lip provides radial support to magnetic pole pieces 30 and magnets providing flux in axial direction 40 and constrains them against rotation around the axial fastener 70. Both of these constraints are against light forces and hence the lip 61 need not be very strong. The centrifugal forces act outward, which is already supported by the axial fastener 70. This lip 61 can be eliminated if more than one axial fastener 70 is used, which can also help distributing the stress.

Having lips 61 made of magnetic material in close proximity of magnets and magnetic pole pieces could lead to increase flux leakage. A way of solving this problem is to insert a non-magnetic spacer 80 between the lip and the rest of the assembly. Effectiveness of the spacer at preventing leakage depends on its radial thickness (thick spacer being more efficient than thin one). Alternatively, a magnet magnetized in radial direction can be used instead of the spacer 80 and is likely to be more effective as it actively opposes the leakage flux and also contributes to the useful flux produced by the permanent magnet rotor. The additional magnet or the spacer can be seen as the flux barrier.

A spline 12 type feature on the shaft 10 with the corresponding feature on the magnetic end-plates 60 for the circumferential constraint resulting in transfer of torque to the shaft 10. For the two-shaft construction shown in FIG. 5*b*, the shaft component 10*a* and the end-plate 60 on the side of shaft component 10*a* can be connected together or they can form an integral member. Similarly, the shaft component 10*b* and the end-plate 60 on the side of shaft component 10*b* can be connected together or they can form an integral member.

A shoulder 11 type feature on the shaft 10 for axial placement of the active components. This feature is not required for the two-shaft construction shown in FIG. 5*b*.

An adhesive can be used at the interface between components to keep the assembly intact against centrifugal and axial forces.

Figure 6A:
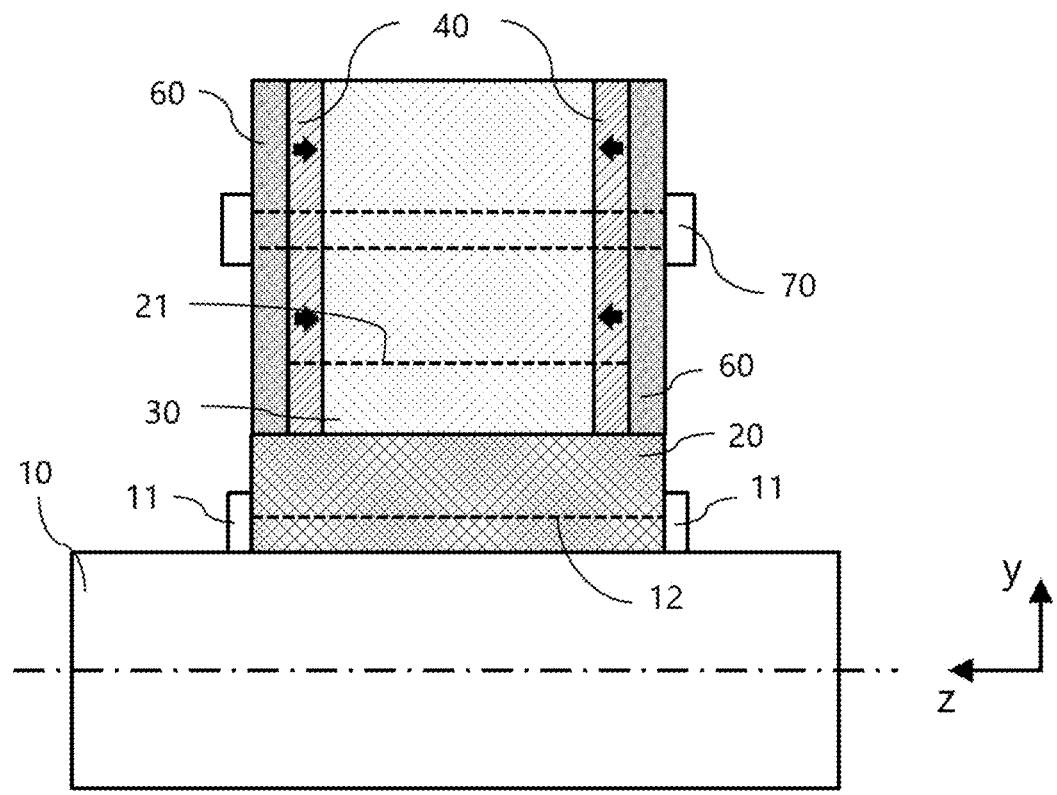
FIG. 6a is a view of the permanent magnet rotor cut along the z-axis and through the magnetic pole piece showing the shaft, rotor hub, magnetic pole piece, magnets providing flux in axial direction, magnetic end-plates and fastener.
Figure 6B:
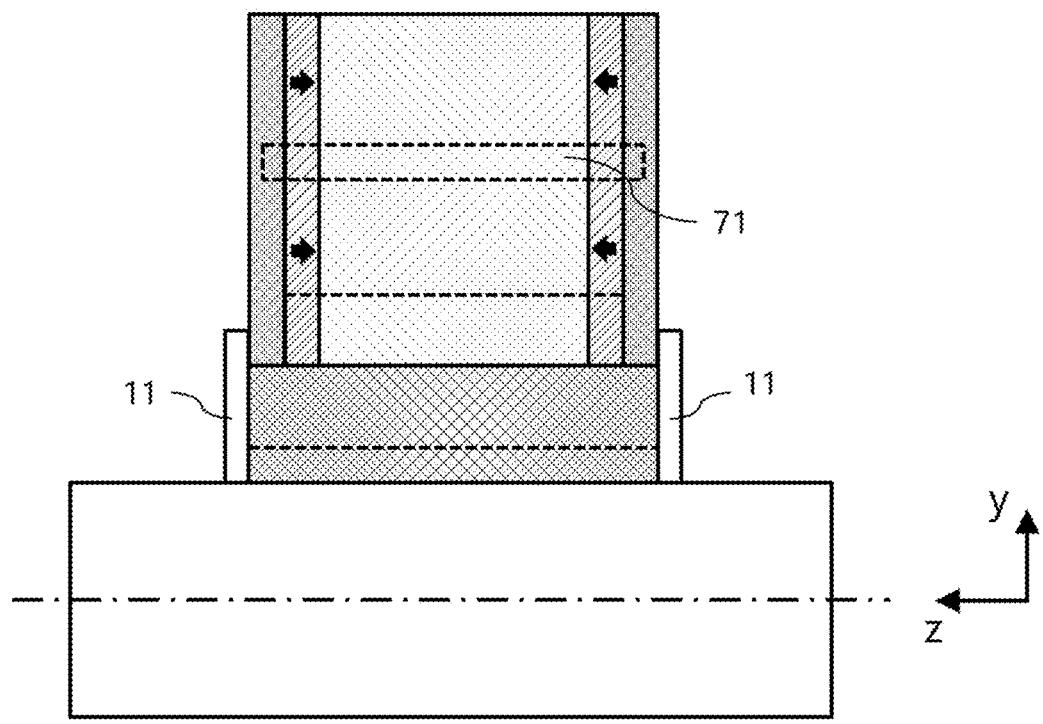
FIG. 6b is a view of the permanent magnet rotor cut along the z-axis and through the magnetic pole piece showing the shaft, rotor hub, magnetic pole piece, magnets providing flux in axial direction, magnetic end-plates and stud.

FIG. 6*a* and FIG. 6*b* show a permanent magnet rotor having a hub and comprises shaft 10, rotor hub 20, magnetic pole piece 30, magnets providing flux in axial direction 40 and magnetic end-plates 60.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20 acting as flux barrier region, therefore needs to be made of structurally strong and non-magnetic material.

Magnetic end-plates 60 are connected indirectly to the shaft, having an inner radius extending to rotor hub 20 and constrained axially and circumferentially using axial fastener 70. These magnetic end-plates 60 are made with ferromagnetic material having isotropic magnetic properties to provide return path for the magnetic flux generated by magnets providing flux in axial direction 40.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud 71 such that it does not go all the way through the magnetic end-plates 60. The advantage is simplification of design. In such a case, the shoulders 11 on shaft 10 has to be made with larger radius to provide axial tightness of active components of the permanent magnet rotor.

Figure 3:
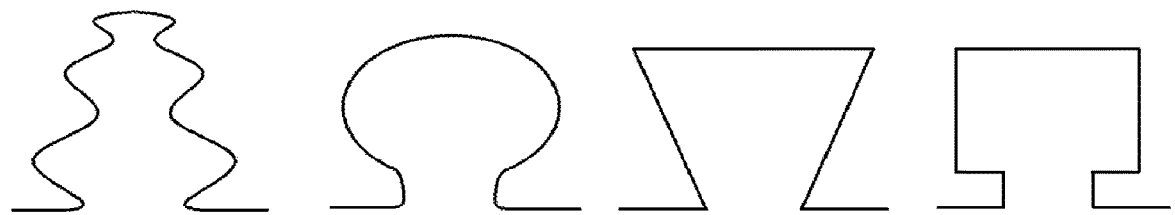
FIG. 3 shows examples of mechanical joints referred to in the detailed description of embodiments.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 7A:
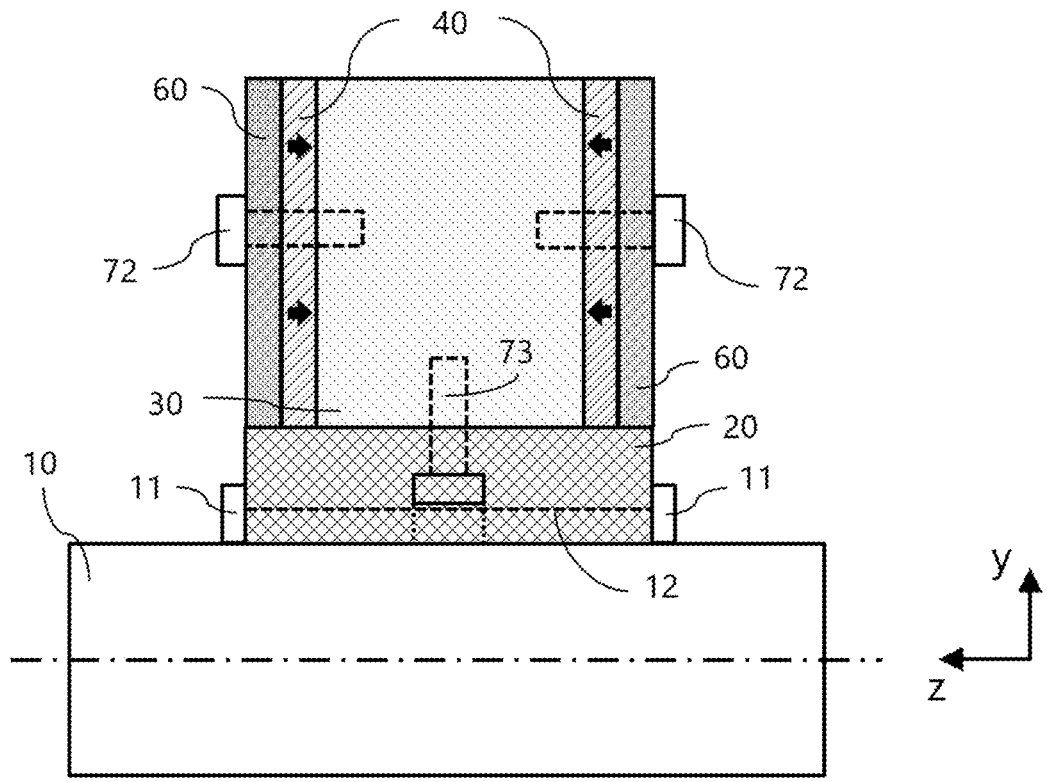
FIG. 7a and FIG. 7b are views of the permanent magnet rotor cut along the z-axis and through the magnetic pole piece showing the shaft, rotor hub, magnetic pole piece, magnets providing flux in axial direction, magnetic end-plates, axial and radial fasteners.
Figure 7B:
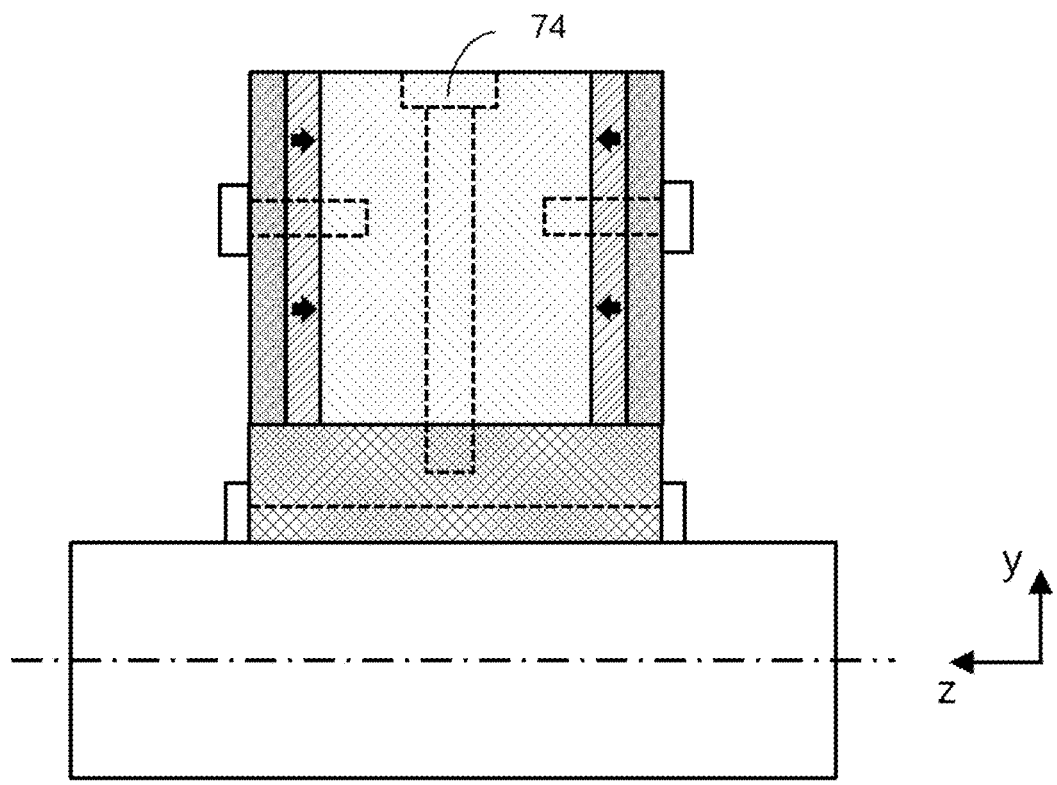

FIG. 7 shows a permanent magnet rotor having a hub and comprises shaft 10, rotor hub 20, magnetic pole piece 30, magnets providing flux in axial direction 40 and magnetic end-plates 60.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

Magnetic end-plates 60 are connected indirectly to the shaft, having an inner radius extending to rotor hub 20 and constrained axially and circumferentially using axial fastener 70. These magnetic end-plates 60 are made with ferromagnetic material having isotropic magnetic properties to provide return path for the magnetic flux generated by magnets providing flux in axial direction 40.

An axial fastener 72 (shown as bolt, can also be rivets) inserted from the external face of magnetic end-plates 60 penetrating partially into the magnetic pole piece 30, providing axial tightness between magnetic end-plates 60, magnets providing flux in axial direction 40 and magnetic pole pieces 30. It also provides radial and circumferential constraints to magnets providing flux in axial direction 40 and magnetic end-plates 60.

A radial fastener 73/74 is used between the rotor hub 20 and magnetic pole piece 30 to provide radial and circumferential constraints of the magnetic pole piece 30. The radial fastener 73 can be inserted from the inner radius of rotor hub 20 into the magnetic pole piece 30. The radial fastener 73 can alternatively be inserted from outer radius of the magnetic pole piece 30 into the rotor hub 20. The radial fastener 73/74 can be made of magnetic material so that magnetic flux generated by the magnets can pass through it. Additionally, non-conductive material is can be used in order to mitigate eddy current power loss.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 8:
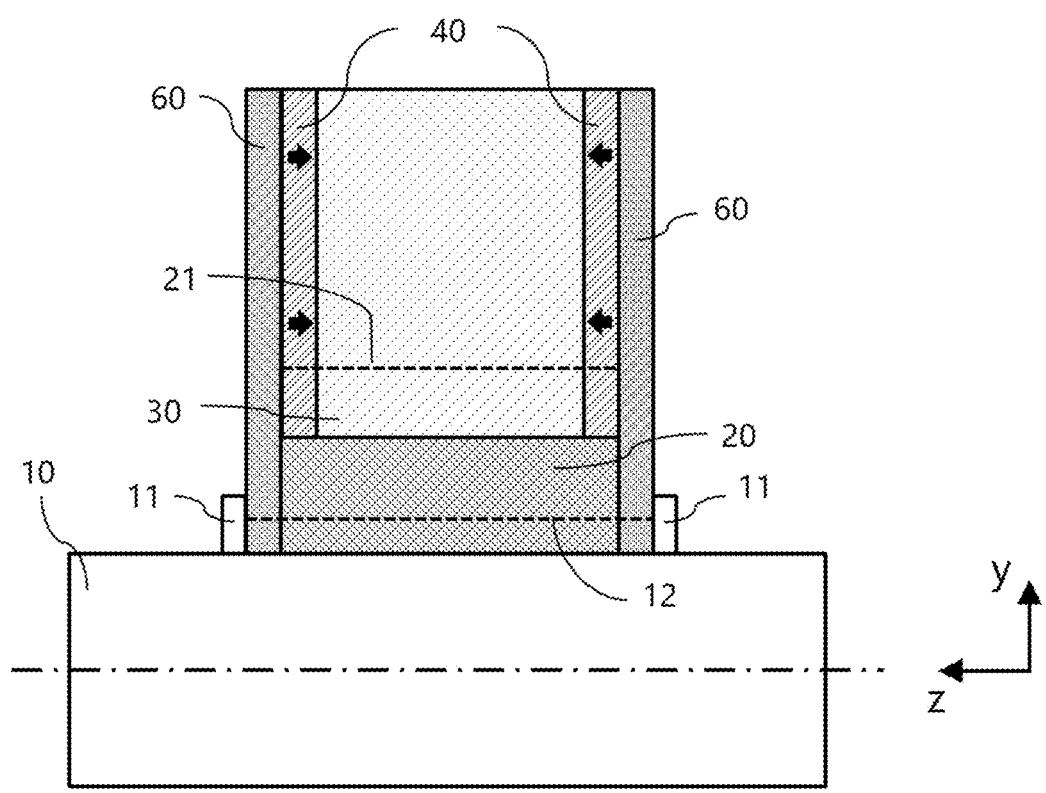
FIG. 8 is a view of the permanent magnet rotor cut along the z-axis and through the magnetic pole piece showing the shaft, rotor hub, magnetic pole piece, magnets providing flux in axial direction and magnetic end-plates.

FIG. 8 shows a permanent magnet rotor having a hub and comprises shaft 10, rotor hub 20, magnetic pole piece 30, magnets providing flux in axial direction 40 and magnetic end-plates 60.

Magnetic end-plates 60 with inner radius extending to shaft 10 having shoulders 11 to provide axial tightness to the magnetic end-plates 60 and hence constraining the other components. These magnetic end-plates 60 are made with ferromagnetic material having isotropic magnetic properties to provide return path for the magnetic flux generated by magnets providing flux in axial direction 40.

A non-magnetic rotor hub 20 acts as a connection between some active components (magnetic pole piece 30, magnets providing flux in axial direction 40 and magnetic end-plates 60) and shaft 10. The axial length of rotor hub 20 needs to be reduced to accommodate the magnetic end-plates 60. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 and magnetic end-plates 60 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 9A:
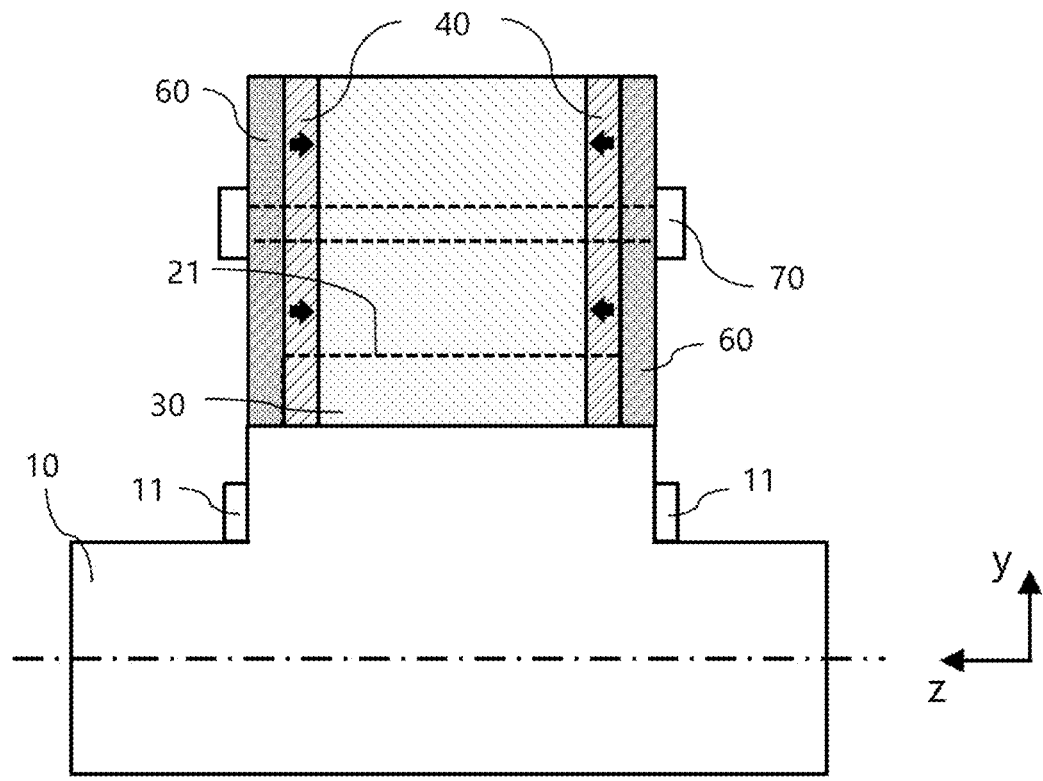
FIG. 9a is a view of the permanent magnet rotor cut along the z-axis and through the magnetic pole piece showing the shaft, magnetic pole piece, magnets providing flux in axial direction, magnetic end-plates and fastener.
Figure 9B:
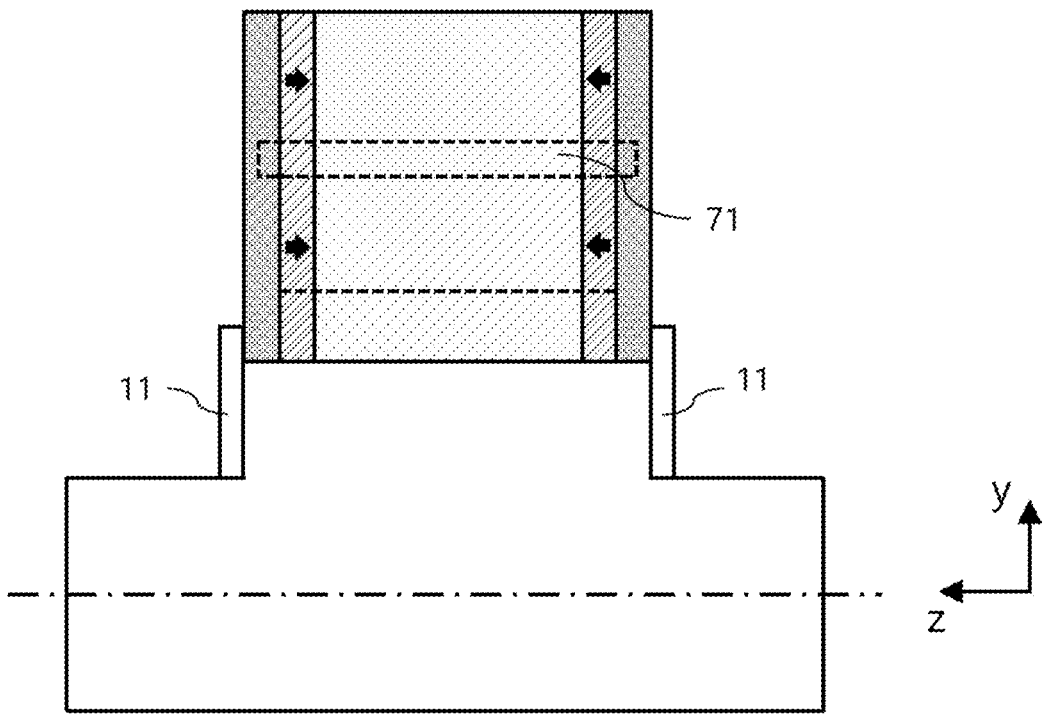
FIG. 9b is a view of the permanent magnet rotor cut along the z-axis and through the magnetic pole piece showing the shaft, magnetic pole piece, magnets providing flux in axial direction, magnetic end-plates and stud.

FIG. 9 is an embodiment showing shaft 10, magnetic pole piece 30, magnets providing flux in axial direction 40 and magnetic end-plates 60.

A shaft 10, with modified cross section at the location of active components (magnetic pole piece 30, magnets providing flux in axial direction 40 and magnetic end-plates 60) for them to be mounted directly on the shaft 10. When magnetic pole pieces 30 and magnets providing flux in axial direction 40 are directly mounted on the shaft 10, the shaft 10 needs to be made of non-magnetic material so as to prevent excessive magnetic flux leakage. Alternatively, shaft 10 could be made of magnetic material and portion of the shaft 10 in close proximity to the magnets providing flux in axial direction 40 and the magnetic pole pieces 30 could be made non-magnetic by special manufacturing techniques. For example, a shaft 10 made of mild magnetic steel could be heat-treated so it becomes austenitic and therefore non-magnetic.

Magnetic end-plates 60 with inner radius extending to shaft 10 and constrained axially and circumferentially using axial fastener 70. These magnetic end-plates 60 are made with ferromagnetic material having isotropic magnetic properties to provide return path for the magnetic flux generated by magnets providing flux in axial direction 40.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud 71 such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A shoulder 11 type feature on the shaft 10 for axial placement of the active components.

An adhesive can be used at the interface between components to keep the assembly intact against centrifugal and axial forces.

Figure 10A:
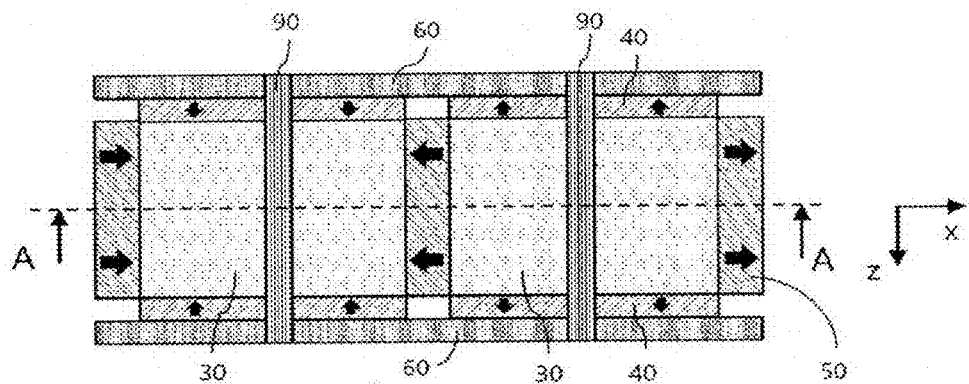
FIG. 10a is the external top view of the permanent magnet rotor when looked along they axis towards x-z plane showing magnetic pole pieces, magnets, magnetic end-plates and axial band.
Figure 10B:
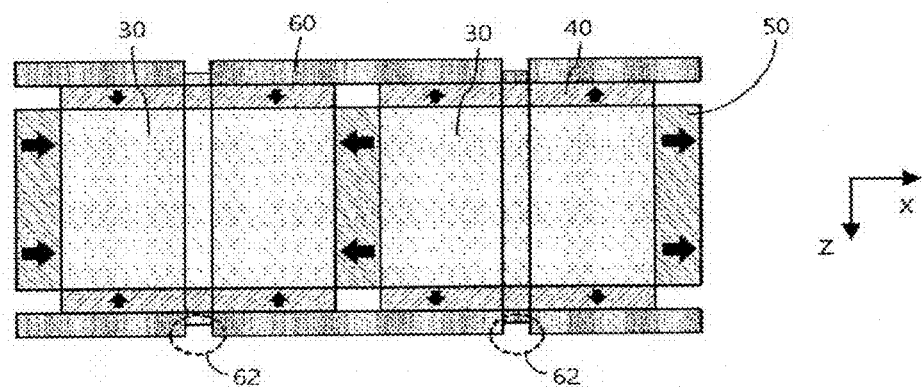
FIG. 10b is the external top view of the permanent magnet rotor when looked along they axis towards x-z plane showing magnetic pole pieces, magnets and magnetic end-plates.
Figure 10C:
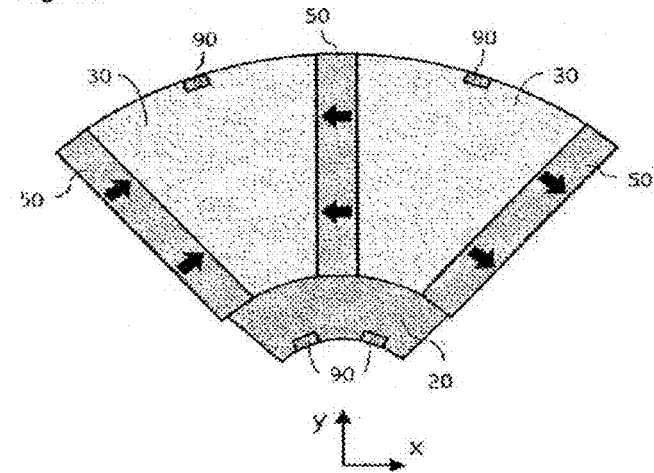
FIG. 10c is the partial cross sectional view of the permanent magnet rotor showing the section AA of FIG. 10a showing magnetic pole pieces, rotor hub, circumferentially magnetised magnets and axial band.

FIG. 10 is an embodiment showing rotor hub 20, magnetic pole pieces 30, magnets providing flux in axial direction 40, circumferentially magnetised magnets 50, magnetic end-plates 60 and a band 90 (possibly made of carbon fibre) in the axial direction across magnetic pole piece 30 and rotor hub 20.

Magnets providing flux in axial direction 40 and circumferentially magnetised magnets 50 shaped as rectangular blocks with the direction of magnetisation such that the flux is focused through the magnetic pole pieces 30 and interacts with the magnetic flux from stator.

Magnetic end-plates 60 made with ferromagnetic material with isotropic magnetic properties to provide return path for the magnetic flux generated by magnets providing flux in axial direction.

A band 90 in the axial direction tying magnetic pole piece 30 with rotor hub 20, magnets providing flux in axial direction 40 and magnetic end-plates 60. These components have corresponding grooves 62 to accommodate the band 20 and the band 20 can possibly be made of carbon fibre. This provides axial, radial and circumferential constraint for magnetic pole pieces 30, magnets providing flux in axial direction 40 and magnetic end-plates 60. Multiple bands (for each magnetic pole piece) can be implemented to improve the load distribution.

The band 90 needs to be made of structurally strong material but not overly stiff material such as carbon or glass fibre. Alternatively, a metallic clip could be used instead of the band 90. Advantage of the metallic clip is that if it is made of magnetic material the magnetic flux generated by the magnets 40, 50 can pass through it (effective air gap between the permanent magnet rotor and stator is affected by the groove needed for the axial band).

An adhesive can be used at the interface between components to keep the assembly intact against centrifugal and axial forces.

Figure 11A:
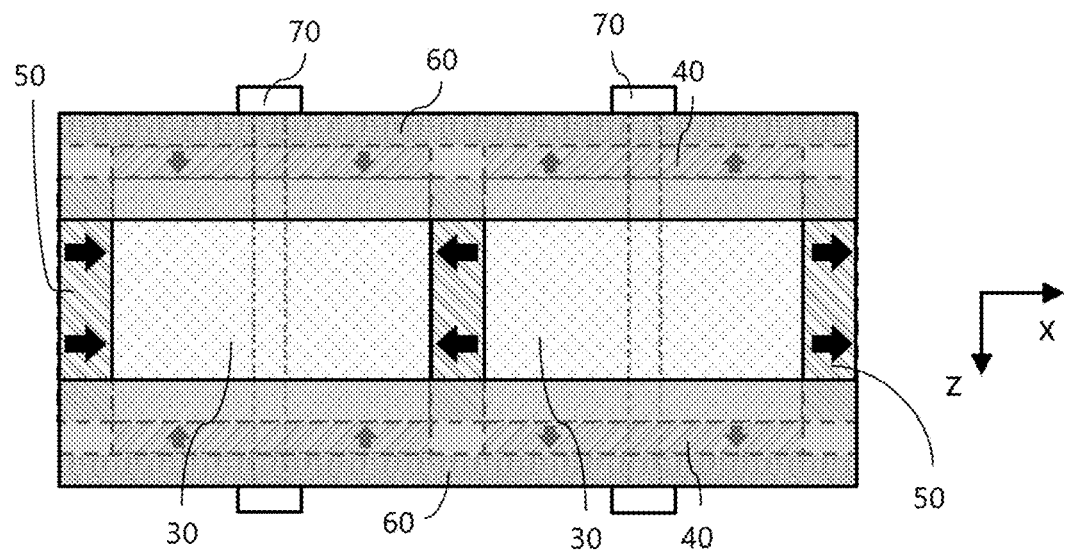
FIG. 11a is the external top view of the permanent magnet rotor when looked along the y axis towards x-z plane showing magnetic pole pieces, magnets, magnetic end-plates and axial fasteners.
Figure 11B:
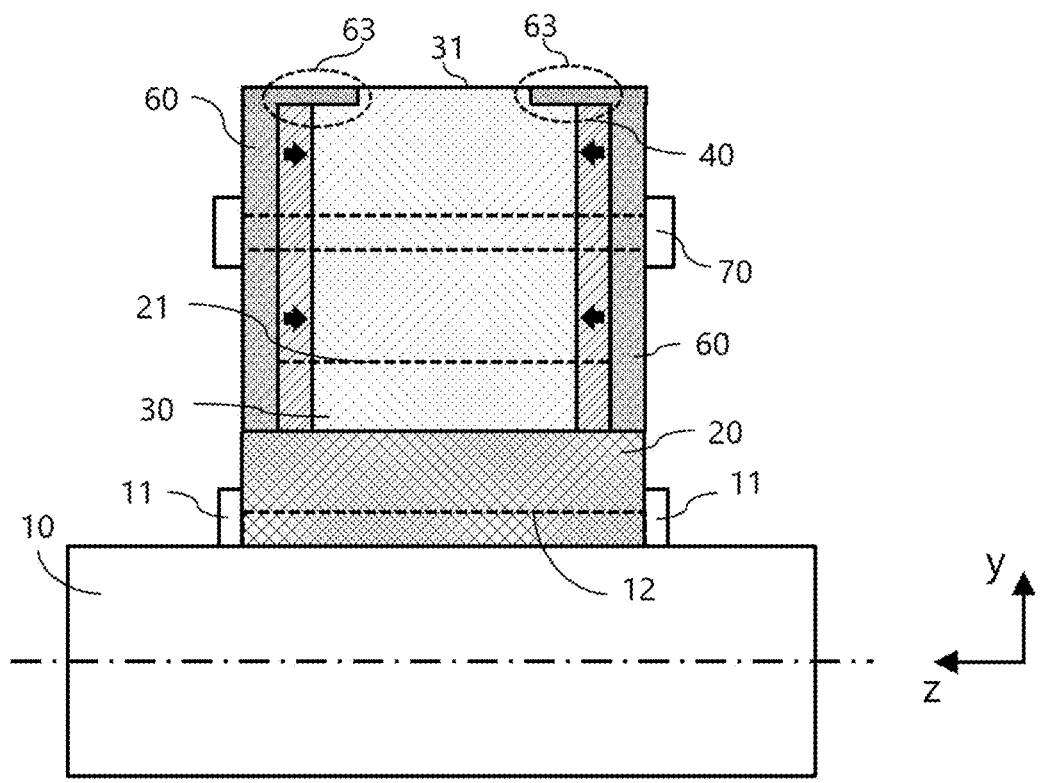
FIG. 11b is a view of the permanent magnet rotor cut along the z-axis and through the magnetic pole piece showing the shaft, rotor hub, magnetic pole piece, magnets providing flux in axial direction, magnetic end-plates, and axial fastener.

FIG. 11 is an embodiment showing shaft 10, rotor hub 20, magnetic pole pieces 30, magnets providing flux in axial direction 40, circumferentially magnetised magnets 50 and magnetic end-plates 60.

Magnets providing flux in axial direction 40 and circumferentially magnetised magnets 50 shaped as rectangular blocks with the direction of magnetisation such that the flux is focused through the magnetic pole pieces 30 and interacts with the magnetic flux from stator.

Magnetic end-plates 60 with axial extension 63 (lip) at the outer radius, completely covering the magnets providing flux in axial direction 40, partially covering circumferentially magnetised magnets 50 and magnetic pole pieces 30. This feature in the magnetic end-plates 60 provide radial constraints to the magnetic pole pieces 30 and all the magnets against centrifugal forces. Since the magnetic end-plates 60 are made of magnetic material, the axial extension (protrusion) provides leakage path for magnetic flux generated by the magnets. If the magnetic end-plates 60 are made of mild steel, the axial extensions (protrusion) could be heat treated in order to reduce their relative permeability to one. Additionally, material with low conductivity (such as magnetic stainless steel) can be used in order to limit eddy current power loss.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

Magnetic pole piece 30 with shape modified at the top 31 such that they fit with the lip feature 63 in the magnetic end-plates 60. This modification at the top of the magnetic pole piece 30 reduces the electromagnetic gap between the permanent magnet rotor and stator.

Axial fasteners 70 (shown as bolts, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fasteners 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 12:
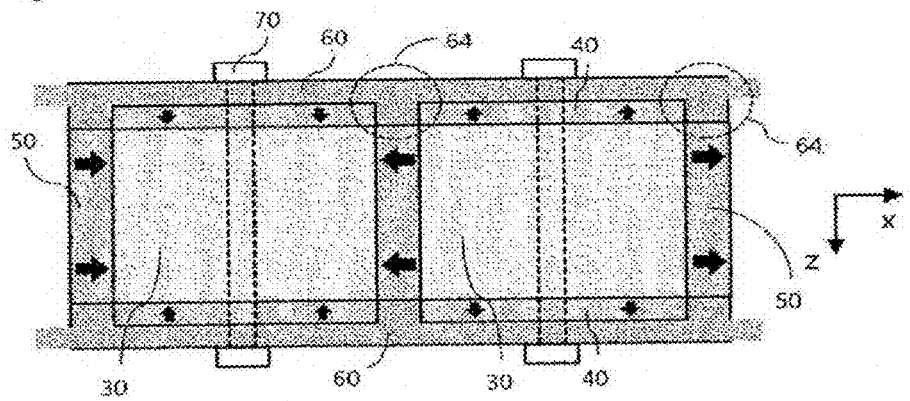
FIG. 12 is the external top view of the permanent magnet rotor when looked along they axis towards x-z plane showing magnetic pole pieces, magnets, magnetic end-plates and axial fasteners.

FIG. 12 is an embodiment showing magnetic pole pieces 30, magnets providing flux in axial direction 40, circumferentially magnetised magnets 50 and magnetic end-plates 60.

Magnets providing flux in axial direction 40 and circumferentially magnetised magnets 50 shaped as rectangular blocks with the direction of magnetisation such that the flux is focused through the magnetic pole pieces and interacts with the magnetic flux from stator.

Magnetic end-plates 60 with ribs 64 running radially and located at the angular position of circumferentially magnetised magnets 50. These ribs 64 are present only on the side of the magnetic end-plates 60 facing magnetic pole pieces 30. The axial dimension of ribs 64 can be variable and the axial length of circumferentially magnetised magnets 50 adjusted according to the axial dimension of the ribs 64. This feature on the magnetic end-plates 60 supports circumferential constraint of the magnets providing flux in axial direction 40. Magnetic end-plates 60 are made with ferromagnetic material with isotropic magnetic properties to provide return path for the magnetic flux generated by magnets providing flux in axial direction 40.

Axial fasteners 70 (shown as bolts, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fasteners 70, if made of electrically conductive material, could be a source of eddy current loss, hence, material with low conductivity can be used. In addition, axial fasteners 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders on shaft has to be made with larger radius to provide axial tightness of active components of the permanent magnet rotor.

An adhesive can be used at the interface between components to keep the assembly intact against centrifugal and axial forces.

FIG. 13 is an embodiment showing magnetic pole pieces 30, magnets providing flux in axial direction 40, circumferentially magnetised magnets 50 and magnetic end-plates 60.

Magnets providing flux in axial direction 40 and circumferentially magnetised magnets 50 shaped as rectangular blocks with the direction of magnetisation such that the flux is focused through the magnetic pole pieces and interacts with the magnetic flux from stator.

Figure 13A:
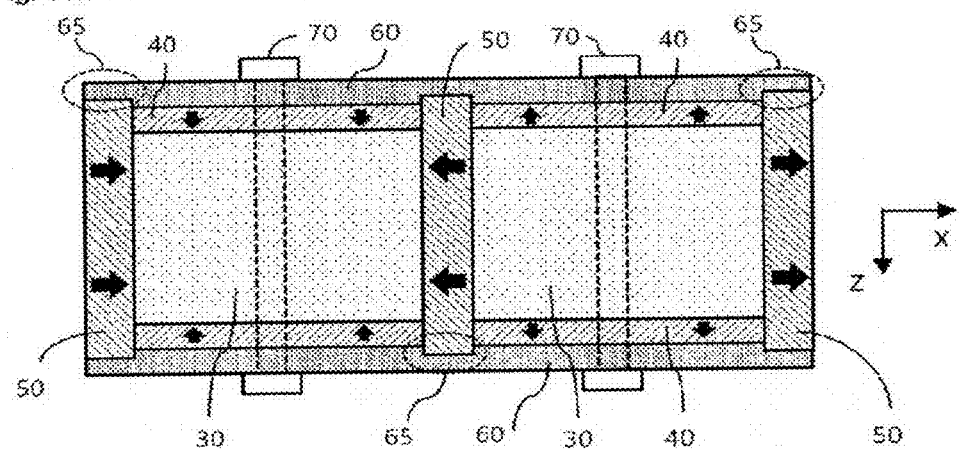
FIG. 13a and FIG. 13b are external top view of the permanent magnet rotor when looked along the y axis towards x-z plane. They show magnetic pole pieces, magnets, magnetic end-plates, sleeve and axial fasteners.

FIG. 13a shows an embodiment having magnetic end-plates 60 with slots 65 running radially and located at the angular position of circumferentially magnetised magnets 50. These slots 65 are present only on the side of the magnetic end-plates 60 facing magnetic pole pieces 30. The slots have axial depth smaller than axial thickness of magnetic end-plates and axial cross section such that it matches the cross section of circumferentially magnetised magnets 50. The axial length of circumferentially magnetised magnets 50 is adjusted according to the axial dimension of the slots 65. This feature on the magnetic end-plates 60 supports circumferential constraint of all the circumferentially magnetised magnets 50. Using this feature, the circumferentially magnetised magnets 50 can be made longer in axial direction, having electromagnetic advantage using the concept of Halbach array. Magnetic end-plates 60 are made with ferromagnetic material with isotropic magnetic properties to provide return path for the magnetic flux generated by magnets providing flux in axial direction 40.

Figure 13B:
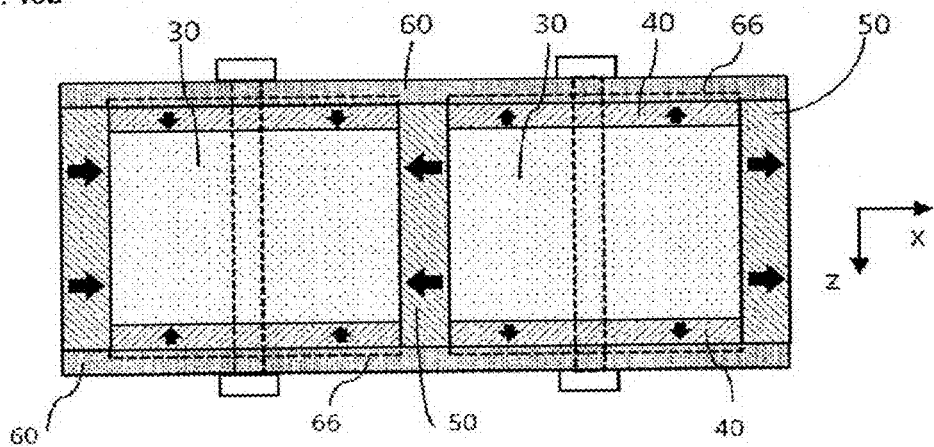

FIG. 13b shows an embodiment having Magnetic end-plates 60 with slots 66 located at the angular position of magnets providing flux in axial direction 40. These slots 66 are present only on the side of the magnetic end-plates 60 facing magnetic pole pieces 30. The slots have axial depth smaller than axial thickness of magnetic end-plates and axial cross section such that it matches the axial cross section of magnets providing flux in axial direction 40. The thickness of magnets providing flux in axial direction 40 is adjusted according to the axial dimension of the slots 66. This feature on the magnetic end-plates 60 supports circumferential constraint of magnets providing flux in axial direction 40. Magnetic end-plates 60 are made with ferromagnetic material with isotropic magnetic properties to provide return path for the magnetic flux generated by magnets providing flux in axial direction 40.

Axial fasteners 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fasteners 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could increase permanent magnet rotor eddy current losses, it is possible to use it for asynchronous starting or permanent magnet rotor oscillation damping.

Alternative to using a fastener 70 is to use a stud such that it does not go all the way through the magnetic end-plates 60. The advantage is simplification of design. In such a case, the shoulders on shaft has to be made with larger radius to provide axial tightness of active components of the permanent magnet rotor.

An adhesive can be used at the interface between components to keep the assembly intact against centrifugal and axial forces.

Figure 14A:
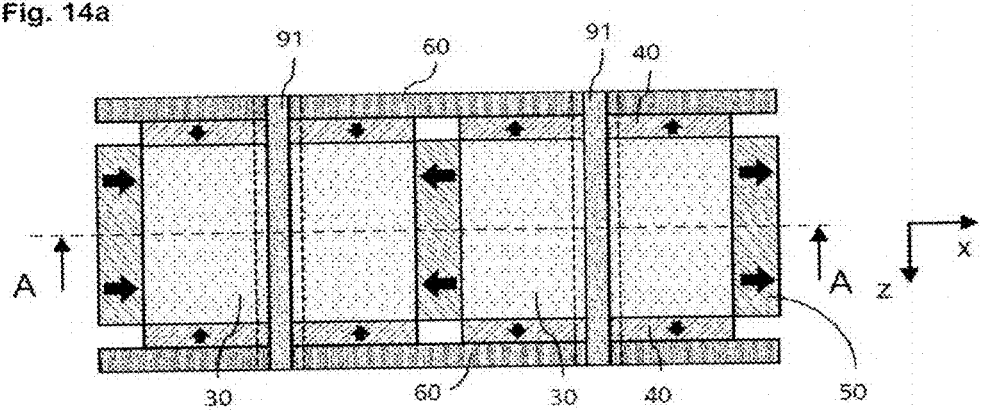
FIG. 14a is the external top view of the permanent magnet rotor when looked along they axis towards x-z plane showing magnetic pole pieces, magnets, magnetic end-plates and axial bar.
Figure 14B:
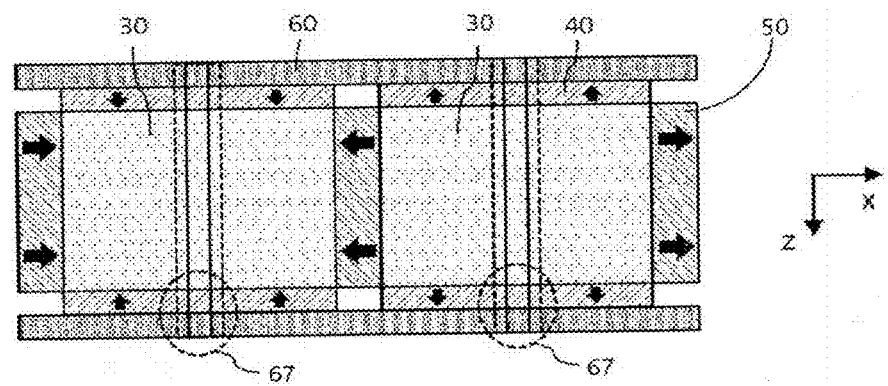
FIG. 14b is the external top view of the permanent magnet rotor when looked along they axis towards x-z plane showing magnetic pole pieces, magnets and magnetic end-plates.
Figure 14C:
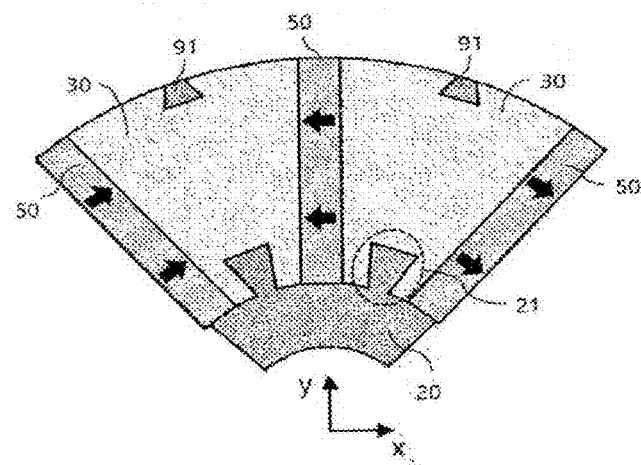
FIG. 14c is the partial cross sectional view of the permanent magnet rotor showing the section AA of FIG. 14a showing magnetic pole pieces, rotor hub, circumferentially magnetised magnets and axial bars.

FIG. 14 is an embodiment showing rotor hub 20, magnetic pole pieces 30, magnets providing flux in axial direction 40, circumferentially magnetised magnets 50, magnetic end-plates 60 and bars 91 in the axial direction connecting magnetic end-plates with magnetic pole piece 30 and magnets providing flux in axial direction 40.

Magnets providing flux in axial direction 40 and circumferentially magnetised magnets 50 shaped as rectangular blocks with the direction of magnetisation such that the flux is focused through the magnetic pole pieces and interacts with the magnetic flux from stator.

Magnetic end-plates 60 made with ferromagnetic material with isotropic magnetic properties to provide return path for the magnetic flux generated by magnets providing flux in axial direction.

Bars 91 having trapezoidal (or similar) cross section running axially between the two magnetic end-plates 60. Bars are shown at outer radius of the permanent magnet rotor where corresponding fitting grooves 67 are made in magnetic pole pieces 30, magnets providing flux in axial direction 40 and magnetic end-plates 60. These axial bars help with radial constraint of magnetic pole pieces 30 and magnets providing flux in axial direction 40. These axial bars 91 can be made of magnetic or non-magnetic material. Magnetic material can help reducing the electromagnetic air gap between permanent magnet rotor and stator. If the bars 91 and the magnetic end-plates 60 are made of electrically conductive material, they can be insulated from each other so that eddy current power loss is limited. Alternatively, the bars 91 and the magnetic end-plates 60 can form a conductive cage similar to that employed in rotors of squirrel cage induction machines. It is also possible to use non-conductive material construct the bars 91.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

An adhesive can be used at the interface between components to keep the assembly intact against centrifugal and axial forces.

Figure 15A:
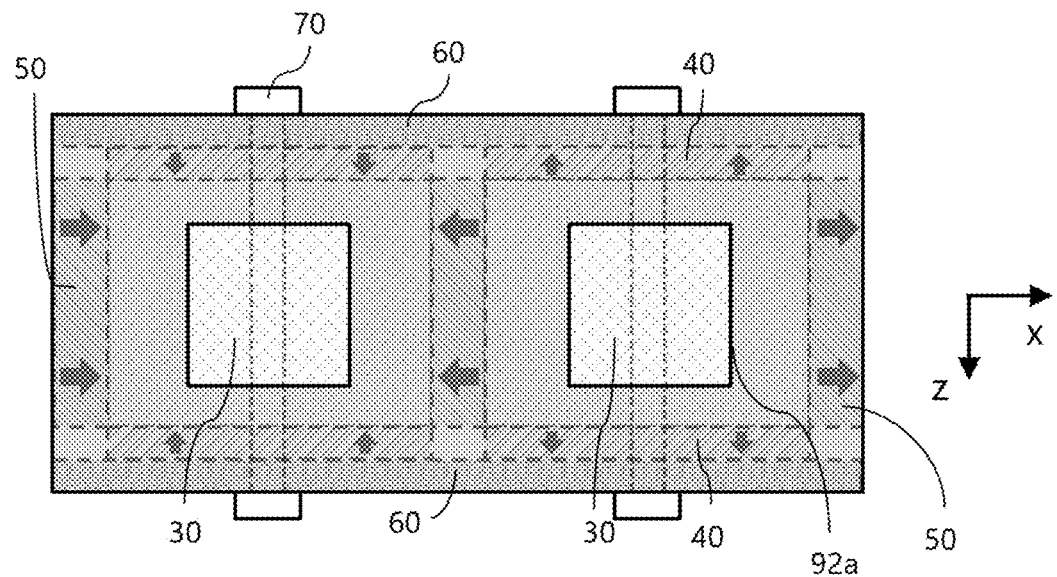
FIG. 15a is the external top view of the permanent magnet rotor when looked along they axis towards x-z plane showing magnetic pole pieces, magnets, magnetic end-plates, sleeve and axial fasteners.
Figure 15B:
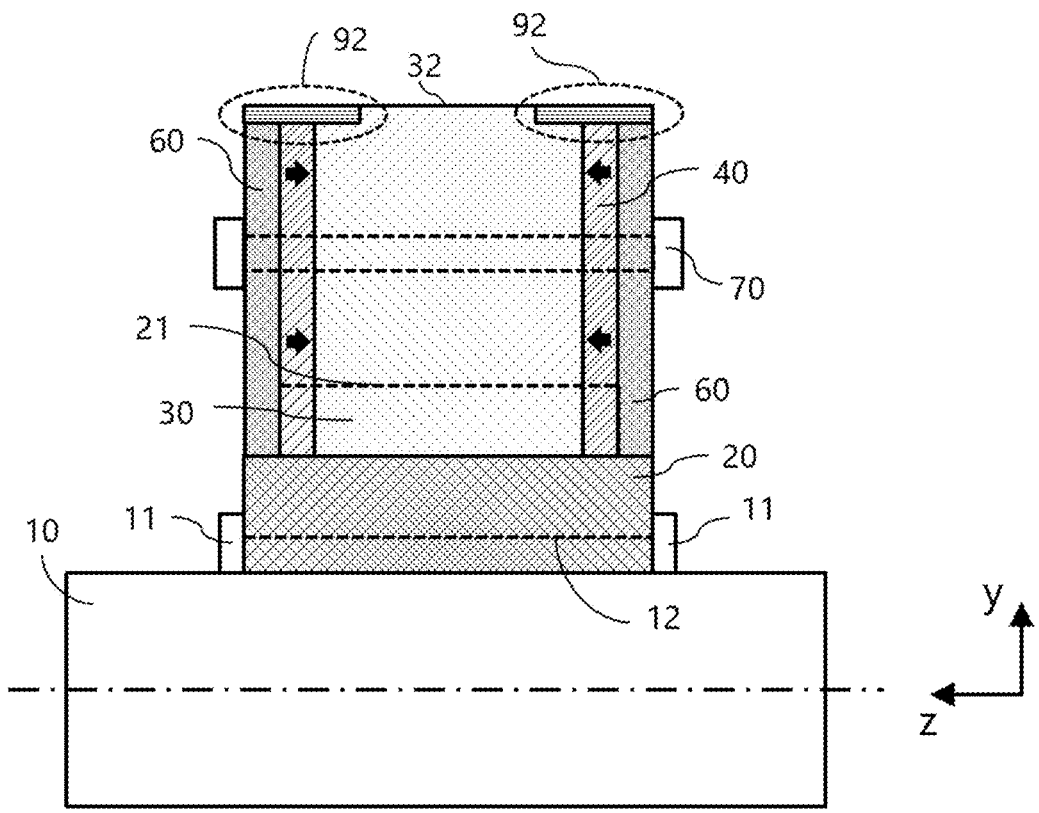
FIG. 15b is a view of the permanent magnet rotor cut along the z-axis and through the magnetic pole piece showing the shaft, rotor hub, magnetic pole piece, magnets providing flux in axial direction, magnetic end-plates, sleeve and axial fastener.

FIG. 15 is an embodiment showing shaft 10, rotor hub 20, magnetic pole pieces 30, magnets providing flux in axial direction 40, circumferentially magnetised magnets 50, magnetic end-plates 60 and retention sleeve 92.

Magnets providing flux in axial direction 40 and circumferentially magnetised magnets 50 shaped as rectangular blocks with the direction of magnetisation such that the flux is focused through the magnetic pole pieces 30 and interacts with the magnetic flux from stator.

A retention sleeve 92, partially or fully covering magnetic pole pieces 30 and covering all the magnets at the outer radius of the permanent magnet rotor. This retention sleeve provide radial constraints to the magnetic pole pieces 30 and all the magnets against centrifugal forces. The sleeve can have window type feature 92*a*, with magnetic pole pieces having a corresponding shape at the top 31 such that they fit with the window-type feature 92*a* on the sleeve 92. Such arrangement can help reducing the electromagnetic gap between the permanent magnet rotor and stator. The sleeve 92 can be made with non-magnetic material so that flux leakage between magnetic pole pieces 30 is minimized. If made with solid material, the sleeve 92 can to be divided into two parts to enable assembly of all the components.

Magnetic end-plates 60 made with ferromagnetic material with isotropic magnetic properties to provide return path for the magnetic flux generated by magnets providing flux in axial direction 40.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could increase permanent magnet rotor eddy current losses, it is possible to use it for asynchronous starting or permanent magnet rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 16A:
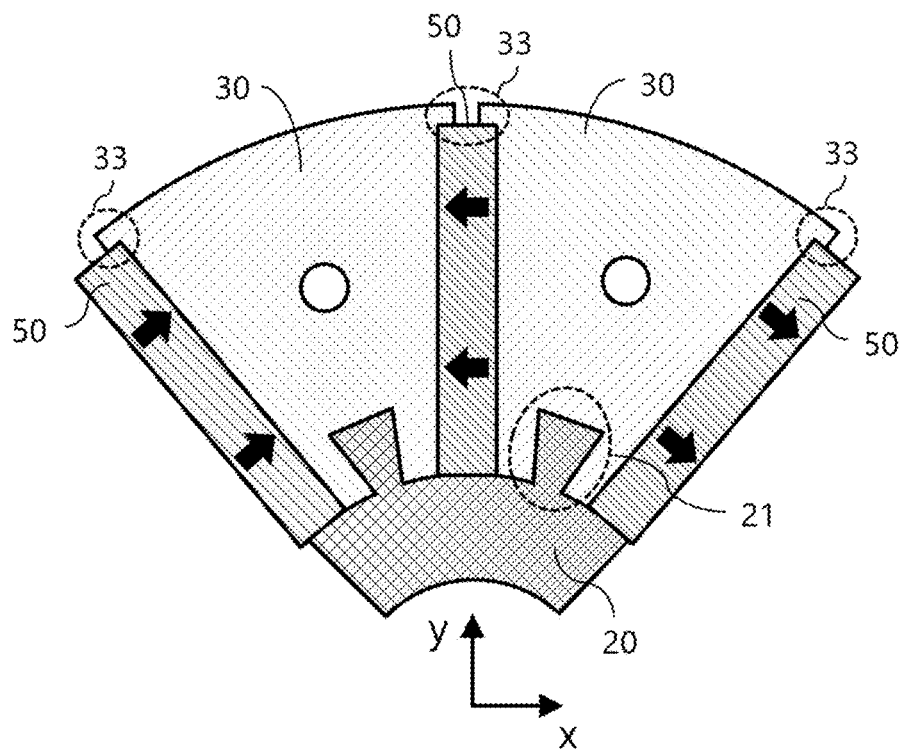
FIG. 16a is the partial cross sectional view (x-y plane) of the permanent magnet rotor cut through the magnetic pole piece showing magnetic pole pieces, rotor hub and circumferentially magnetised magnets.
Figure 16B:
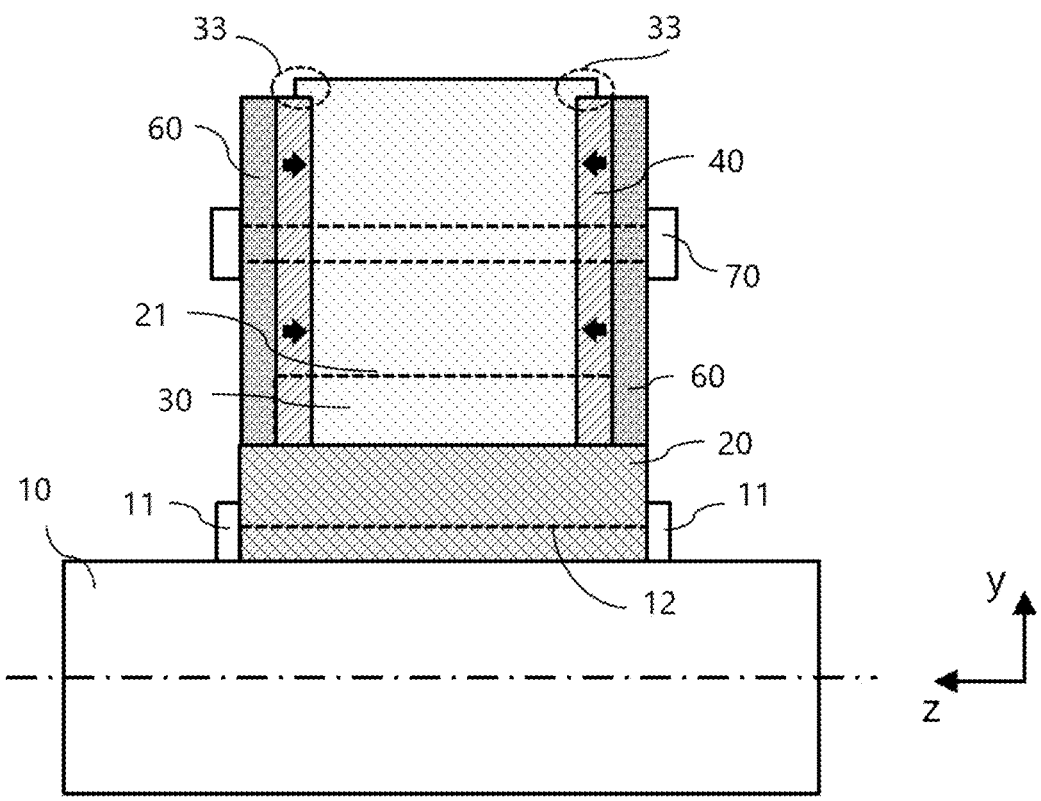
FIG. 16b is a view of the permanent magnet rotor cut along the z-axis and through the magnetic pole piece showing the shaft, rotor hub, magnetic pole piece, magnets providing flux in axial direction, magnetic end-plates and axial fastener.

FIG. 16 is an embodiment showing shaft 10, rotor hub 20, magnetic pole pieces 30, magnets providing flux in axial direction 40, circumferentially magnetised magnets 50 and magnetic end-plates 60.

Magnets providing flux in axial direction 40 and circumferentially magnetised magnets 50 shaped as rectangular blocks with the direction of magnetisation such that the flux is focused through the magnetic pole pieces 30 and interacts with the magnetic flux from stator.

Magnetic end-plates 60 made with ferromagnetic material with isotropic magnetic properties to provide return path for the magnetic flux generated by magnets providing flux in axial direction 40.

Magnetic pole piece 30 with extended shape 33 at the outer radius in the axial and circumferential direction. This shape of the magnetic pole piece 30 provides radial constraints to magnets providing flux in axial direction 40 as well as circumferentially magnetised magnets 50.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 17A:
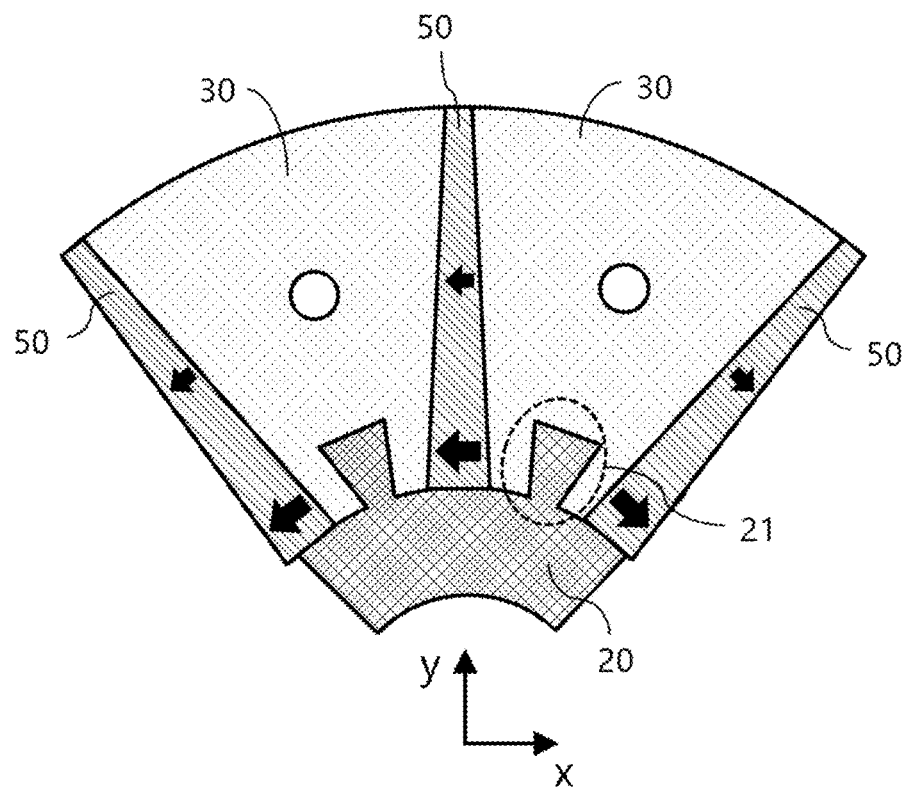
FIG. 17a is the partial cross sectional view (x-y plane) of the permanent magnet rotor cut through the magnetic pole piece showing magnetic pole pieces, rotor hub and circumferentially magnetised magnets.
Figure 17B:
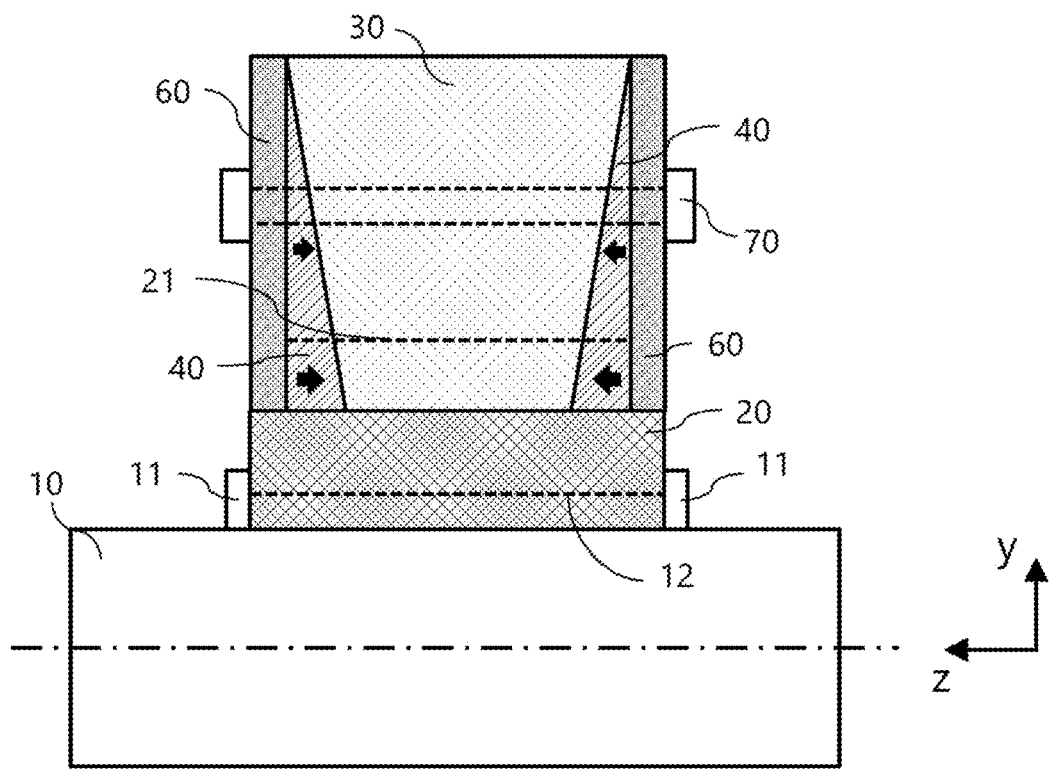
FIG. 17b is a view of the permanent magnet rotor cut along the z-axis and through the magnetic pole piece showing the shaft, rotor hub, magnetic pole piece, magnets providing flux in axial direction, magnetic end-plates and axial fastener.

FIG. 17 is an embodiment showing shaft 10, rotor hub 20, magnetic pole pieces 30, magnets providing flux in axial direction 40, circumferentially magnetised magnets 50 and magnetic end-plates 60.

Circumferentially magnetised magnets 50 (shown in x-y view, FIG. 17*a*) with trapezoidal cross section having reducing thickness with increasing radius. Outer radius of circumferentially magnetised magnets 50 can be equal to or smaller than outer radius of magnetic pole pieces 30.

Magnets providing flux in axial direction 40 (shown in y-z view, FIG. 17*b*) with triangular cross section having reducing thickness with increasing radius. Outer radius of magnets providing flux in axial direction 40 can be equal to or smaller than outer radius of magnetic pole pieces 30.

Magnetic end-plates 60 made with ferromagnetic material with isotropic magnetic properties to provide return path for the magnetic flux generated by magnets providing flux in axial direction 40.

Magnetic pole piece 30 with cross section modified in x-y plane and y-z plane to accommodate the shape of circumferentially 50 and magnets providing flux in axial direction 50, respectively, providing radial constraints to these magnets.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 18A:
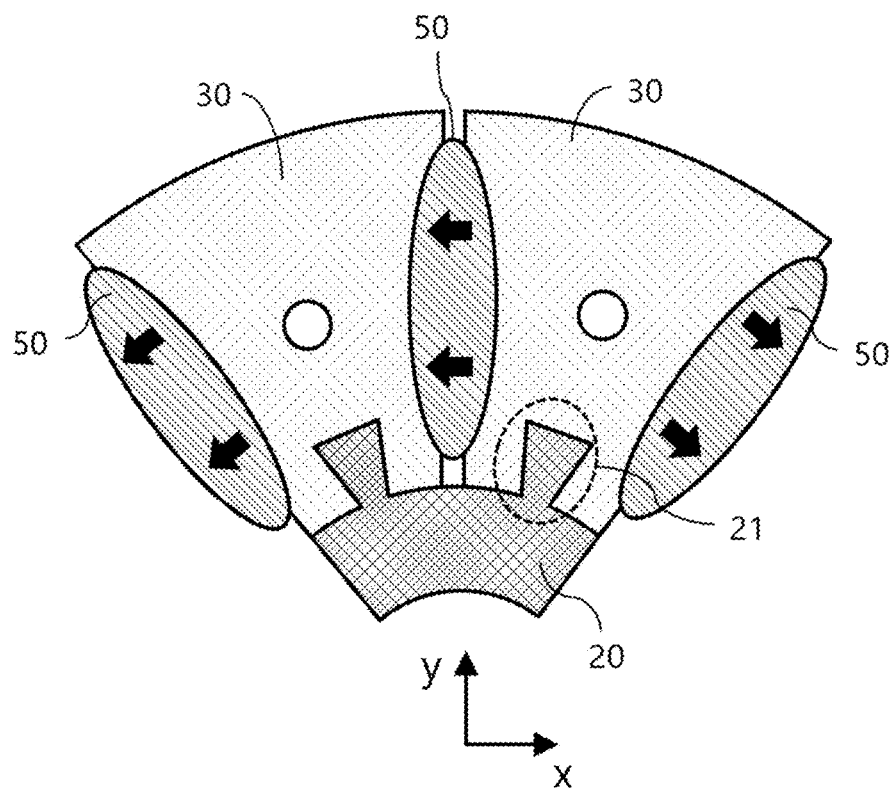
FIG. 18a is the partial cross sectional view (x-y plane) of the permanent magnet rotor cut through the magnetic pole piece showing magnetic pole pieces, rotor hub and circumferentially magnetised magnets.
Figure 18B:
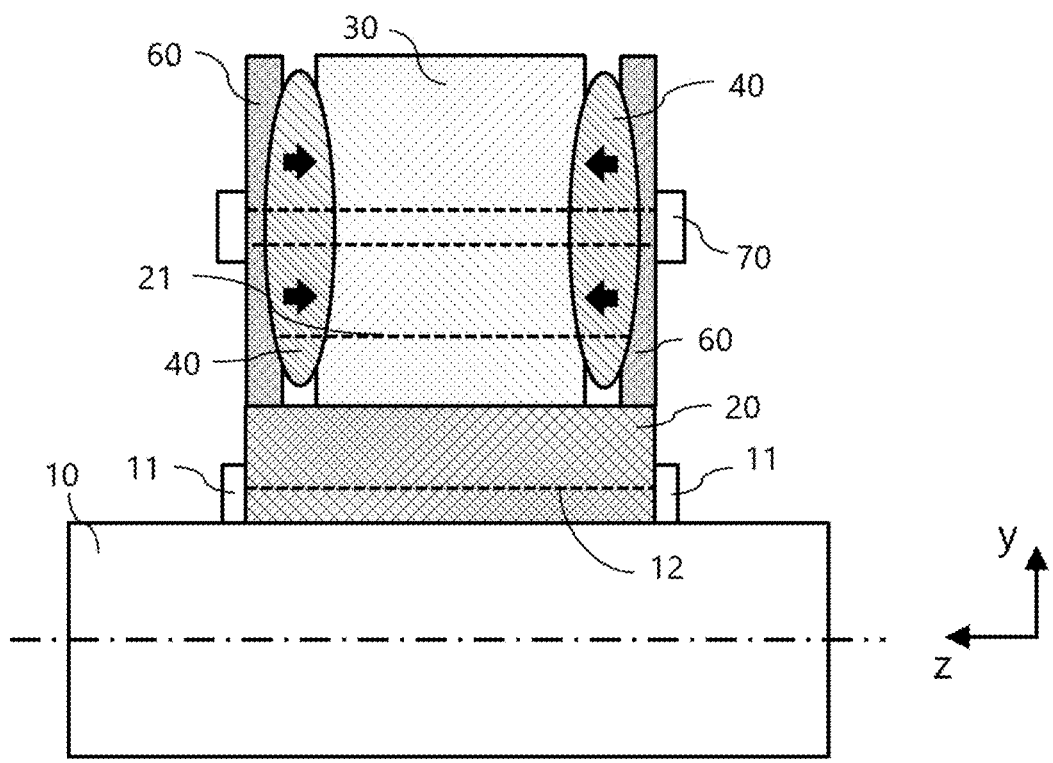
FIG. 18b is a view of the permanent magnet rotor cut along the z-axis and through the magnetic pole piece showing the shaft, rotor hub, magnetic pole piece, magnets providing flux in axial direction, magnetic end-plates and axial fastener.

FIG. 18 is an embodiment showing shaft 10, rotor hub 20, magnetic pole pieces 30, magnets providing flux in axial direction 40, circumferentially magnetised magnets 50 and magnetic end-plates 60.

Circumferentially magnetised magnets 50 (shown in x-y view, FIG. 18*a*) with oval cross section.

Magnets providing flux in axial direction 40 (shown in y-z view, FIG. 18*b*) with oval cross section.

Magnetic end-plates 60 made with ferromagnetic material with isotropic magnetic properties to provide return path for the magnetic flux generated by magnets providing flux in axial direction. The shape of the magnetic end-plates 60 is modified to accommodate the oval shape of magnets providing flux in axial direction 40, supporting radial constraints for these magnets. Minimal axial thickness of the magnetic end-plates 60 must be such that excessive saturation is avoided.

Magnetic pole piece 30 with cross section modified in x-y plane and y-z plane to accommodate the shape of circumferentially 50 and magnets providing flux in axial direction 50, respectively, providing radial constraints to these magnets.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 19A:
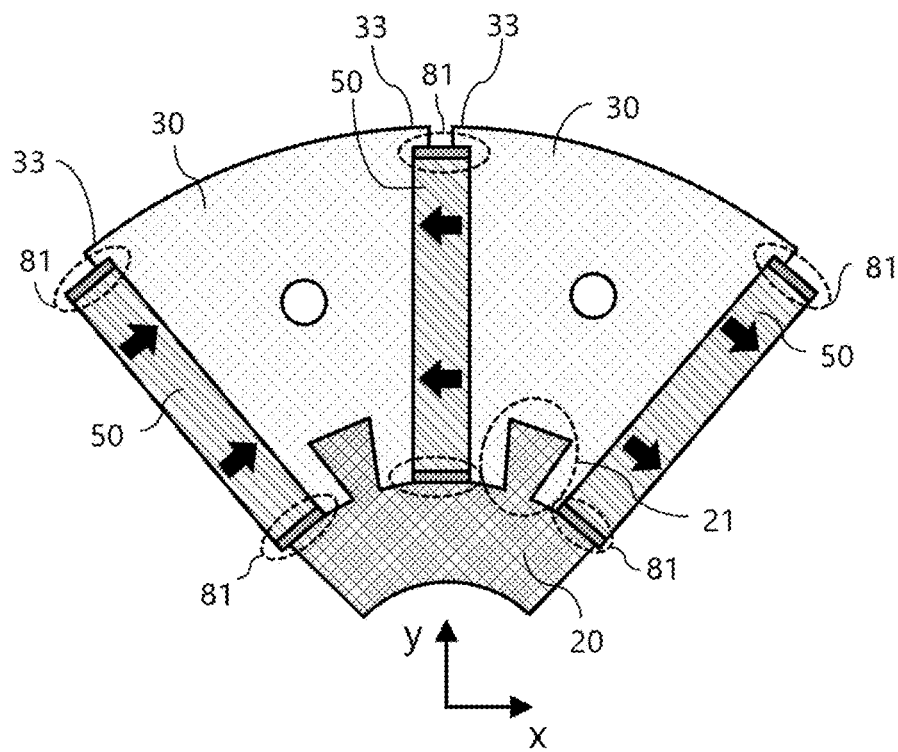
FIG. 19a is the partial cross sectional view (x-y plane) of the permanent magnet rotor cut through the magnetic pole pieces showing magnetic pole pieces, rotor hub, circumferentially magnetised magnets and spacers
Figure 19B:
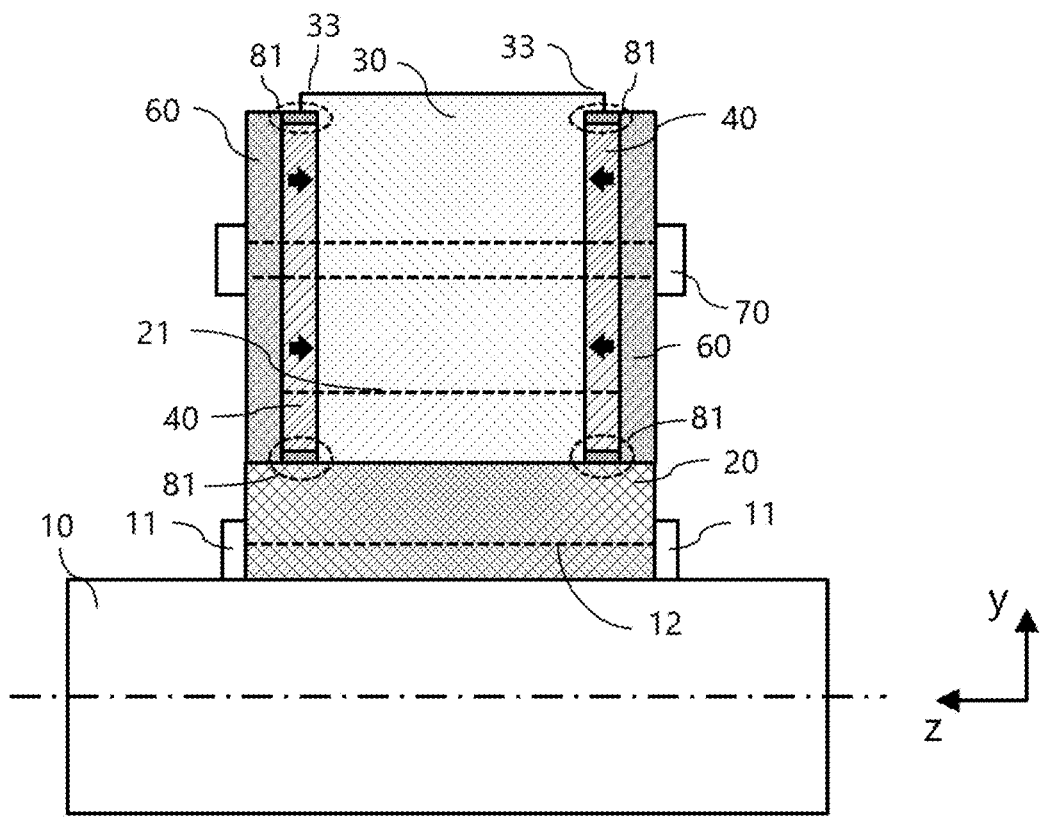
FIG. 19b is a view of the permanent magnet rotor cut along the z-axis and through the magnetic pole piece showing the shaft, rotor hub, magnetic pole piece, magnets providing flux in axial direction, magnetic end-plates, axial fastener and spacers.

FIG. 19 is an embodiment showing shaft 10, rotor hub 20, magnetic pole pieces 30, magnets providing flux in axial direction 40, circumferentially magnetised magnets 50, magnetic end-plates 60 and non-magnetic spacers 81.

Magnets providing flux in axial direction 40 and circumferentially magnetised magnets 50 shaped as rectangular blocks with the direction of magnetisation such that the flux is focused through the magnetic pole pieces 30 and interacts with the magnetic flux from stator.

Magnetic end-plates 60 made with ferromagnetic material with isotropic magnetic properties to provide return path for the magnetic flux generated by magnets providing flux in axial direction.

Magnetic pole piece 30 with extended shape 33 at the outer radius in the axial and circumferential direction. This shape of the magnetic pole piece 30 provides radial constraints to magnets providing flux in axial direction 40 as well as circumferentially magnetised magnets 50, in addition to constraining non-magnetic spacers 81.

Spacers 81 made of non-magnetic material placed at the outer and/or inner radius of circumferentially magnetised magnets 50 as well as magnets providing flux in axial direction 40. At the outer radius, the spacer 81 is constrained using the extended top of the magnetic pole piece 30. The spacer 81 at the inner radius is sandwiched between magnets 40, 50 and rotor hub 20. This spacer 81 can be made with non-magnetic material, which reduces risk of demagnetisation magnets 40, 50 due to magnetic field fringing near the edges parallel to the axis of magnetisation.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

Figure 20A:
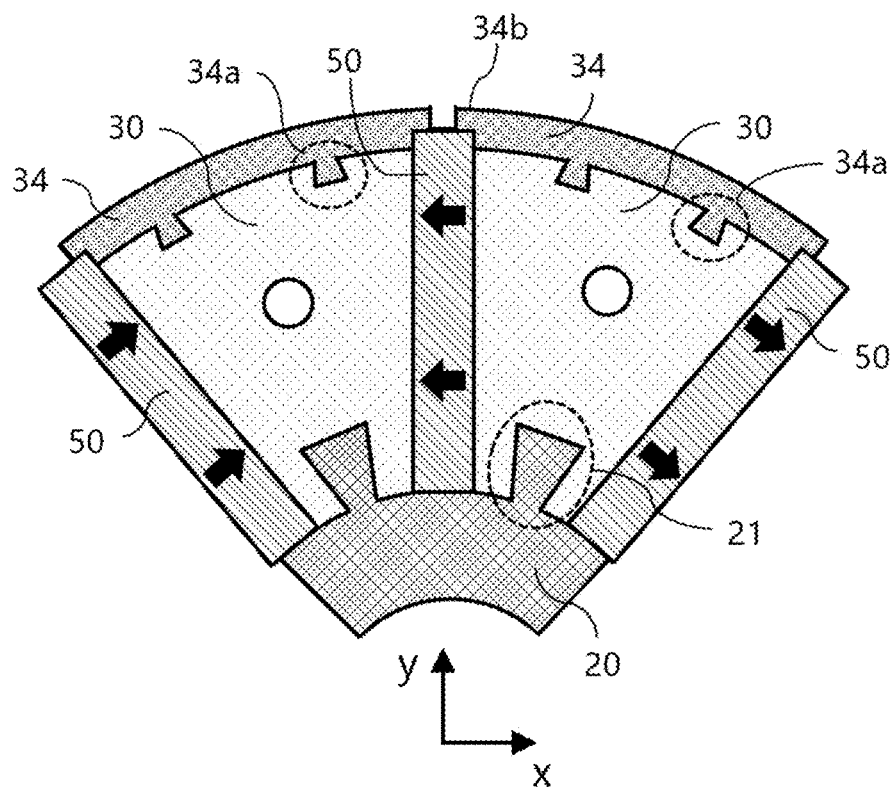
FIG. 20a is the partial cross sectional view (x-y plane) of the permanent magnet rotor cut through the magnetic pole pieces showing magnetic pole pieces (including pole body and pole shoe), rotor hub and circumferentially magnetised magnets.
Figure 20B:
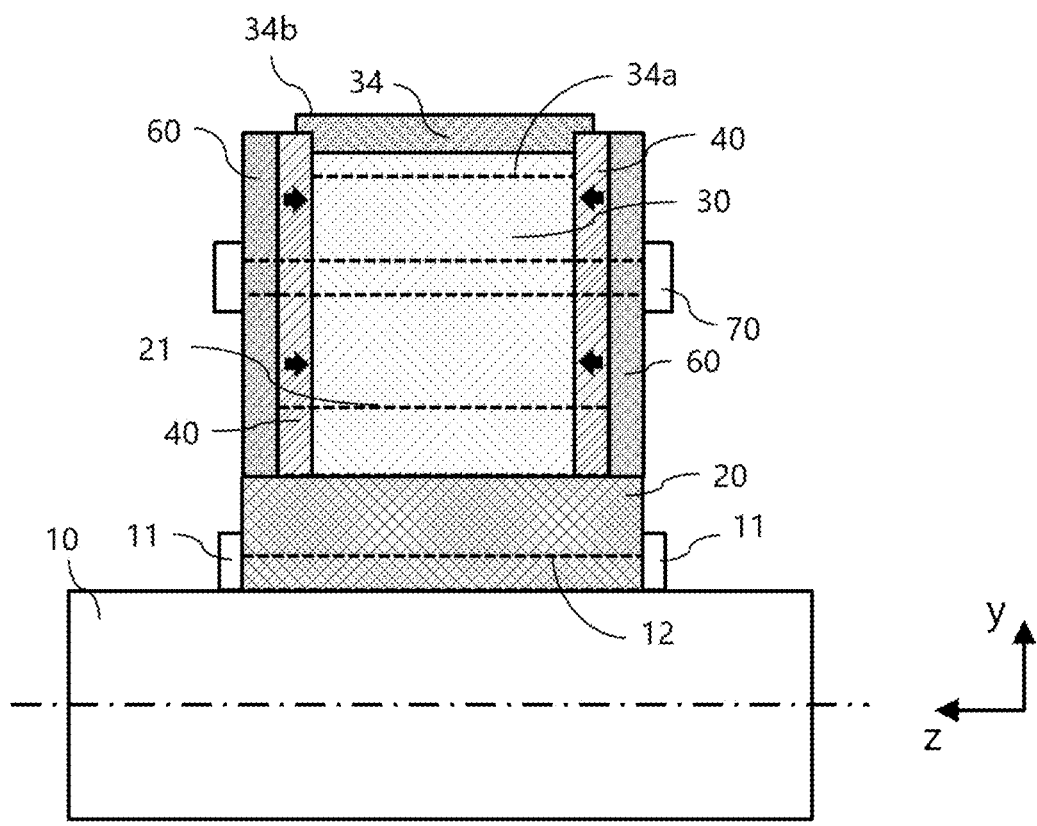
FIG. 20b is a view of the permanent magnet rotor cut along the z-axis and through the magnetic pole piece showing the shaft, rotor hub, magnetic pole piece (including pole body and pole shoe), magnets providing flux in axial direction, magnetic end-plates and axial fastener.

FIG. 20 is an embodiment showing shaft 10, rotor hub 20, magnets providing flux in axial direction 40, circumferentially magnetised magnets 50, magnetic end-plates 60 and magnetic pole pieces divided into two parts: pole body 30 and pole shoe 34.

Magnets providing flux in axial direction 40 and circumferentially magnetised magnets 50 shaped as rectangular blocks with the direction of magnetisation such that the flux is focused through the magnetic pole pieces 30 and interacts with the magnetic flux from stator.

Magnetic end-plates 60 made with ferromagnetic material with isotropic magnetic properties to provide return path for the magnetic flux generated by magnets providing flux in axial direction.

Magnetic pole piece divided into two parts: pole body 30 and pole shoe 34. These two parts are mechanically attached to each other using mechanical joint (examples shown in FIG. 3) feature 34a. Pole shoe 34 has extended shape 34b at the outer radius in the axial as well as circumferential direction. This shape provides radial constraints to magnets providing flux in axial direction 40 and circumferentially magnetised magnets 50. Here, the pole body 30 can be made of a solid material with isotropic magnetic properties. The pole shoe 34 can be made of laminations or soft magnetic composite. Such an arrangement helps to reduce losses due to eddy currents.

A non-magnetic rotor hub 20 acts as a connection between some active components (magnetic pole piece 30, magnets providing flux in axial direction 40 and magnetic end-plates 60) and shaft 10. The rotor hub 20 is responsible for transferring torque between the attached active components 30, 40, 60 and the shaft 10. Since the magnets providing flux in axial direction 40 and magnetic pole pieces 30 are directly interfaced with the rotor hub 20, the amount of flux leaking through the rotor hub 20 must be minimized. The rotor hub 20, therefore needs to be made of structurally strong and non-magnetic material.

An axial fastener 70 (shown as bolt, can also be tie bars or rivets) provides axial constraints to magnetic end-plates 60, magnets providing flux in axial direction 40 and magnetic pole pieces 30. It also provides radial and circumferential constraints to magnets providing flux in axial direction 40 and magnetic end-plates 60. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 has to be made with larger radius to provide axial tightness of active components of the permanent magnet rotor.

A mechanical joint 21 (examples shown in FIG. 3) feature is used between the rotor hub 20/magnetic pole piece 30 and rotor hub 20/magnets providing flux in axial direction 40 interface to help with radial and circumferential constraints.

A spline 12 type feature on the shaft 10 with the corresponding feature on the rotor hub 20 for the circumferential constraint resulting in transfer of torque to the shaft 10.

A shoulder 11 type feature on the shaft 10 for axial placement of the rotor hub 20.

An adhesive can be used at the interface between components to keep the assembly intact against centrifugal and axial forces.

FIG. 21 is an embodiment showing magnetic pole pieces 30, magnets providing flux in axial direction 40, circumferentially magnetised magnets 50/41 and magnetic end-plates 60.

Magnets providing flux in axial direction 40 described in previous embodiments can be advantageously replaced by so-called Halbach array providing magnetic flux in axial direction. Halbach array is an array of magnets 40, 41 arranged in a pattern which strengthens magnetic field on one side of the array and weakens it on the other side.

Figure 21A:
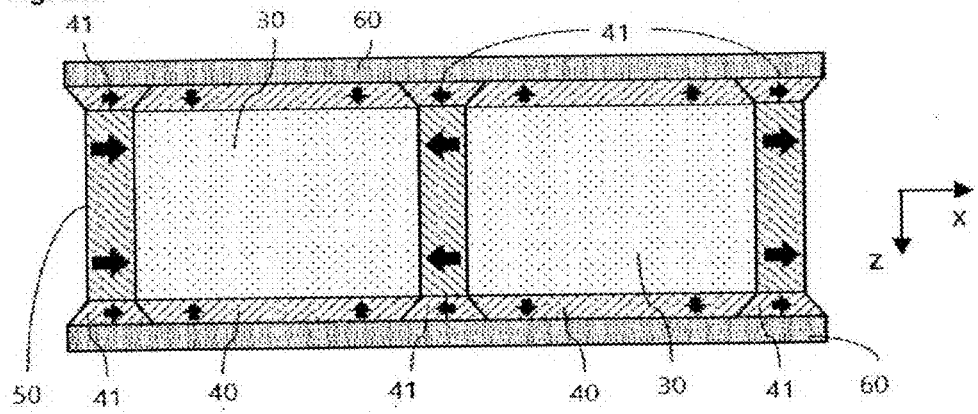
FIG. 21a, FIG. 21b and FIG. 21c are the external top view of the permanent magnet rotor when looked along the y axis towards x-z plane showing magnetic pole pieces, magnets and magnetic end-plates.
Figure 21B:
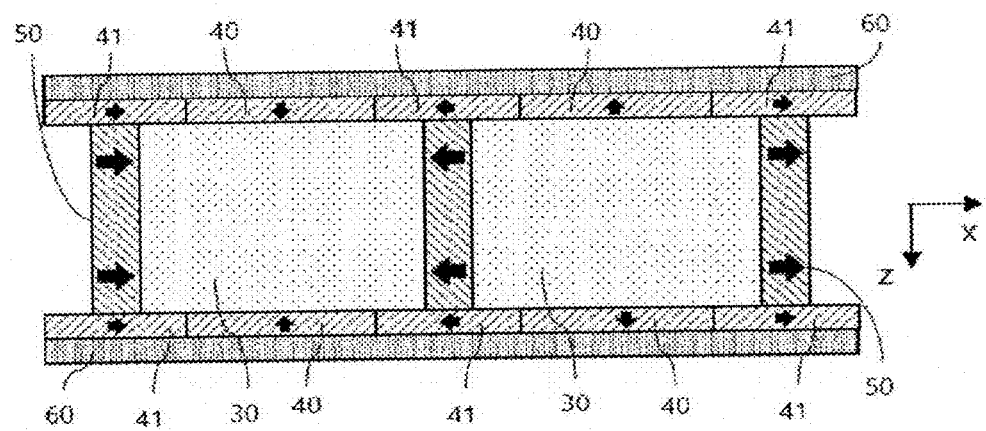
Figure 21C:
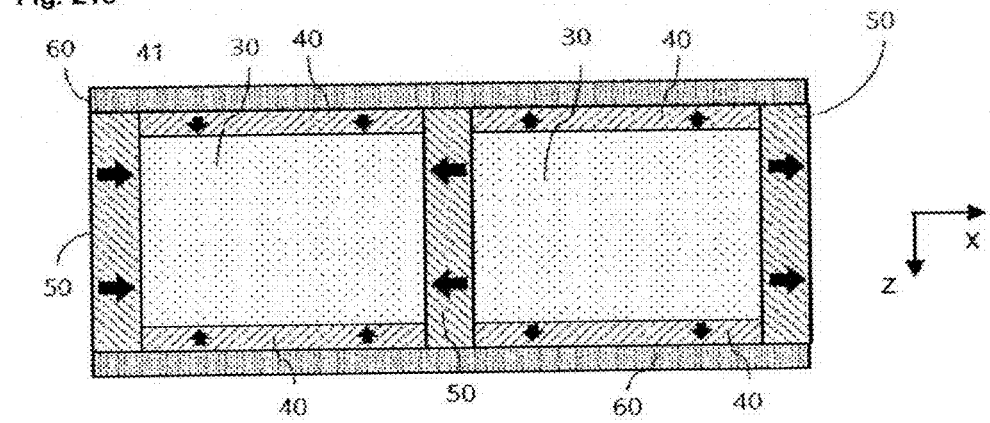

In case of presented embodiments, the Halbach array comprise magnets providing flux in axial direction 40 and circumferentially magnetised magnets 41 arranged in alternate manner as depicted in FIG. 21a and FIG. 21b. The Halbach array can also be constructed using more number of magnets 40/41 than depicted in FIG. 21a and FIG. 21b. The strong side of the Halbach array is the side adjacent to the magnetic pole pieces 30. Since magnetic flux density on the weak side of the array is minimized, thickness of magnetic end-plates 60 can be substantially reduced or they can even be completely eliminated or made of non-magnetic material.

Ratio of circumferential width of circumferentially magnetised magnets 41 and magnets providing flux in axial direction 40 can be chosen based on required performance. However, it typically equals 1 (these magnets 40, 41 have the same circumferential width).

Special case of Halbach array (shown in FIG. 21c) is where the circumferentially magnetised magnets 50 are axially extended so that they are axially longer than magnetic pole pieces 30. Circumferentially magnetised magnets' 50 overhangs (the portion of circumferentially magnetised magnets 50 not being in direct contact with magnetic pole pieces 30) form Halbach array with magnets providing flux in axial direction 40, although Halbach effect (strengthening of field on one side of the magnet array) is weak since circumferential width of magnets providing flux in axial direction 40 is much larger than width of circumferentially magnetised magnets 50.

An adhesive can be used at the interface between components to keep the assembly intact against centrifugal and axial forces.

Figure 22:
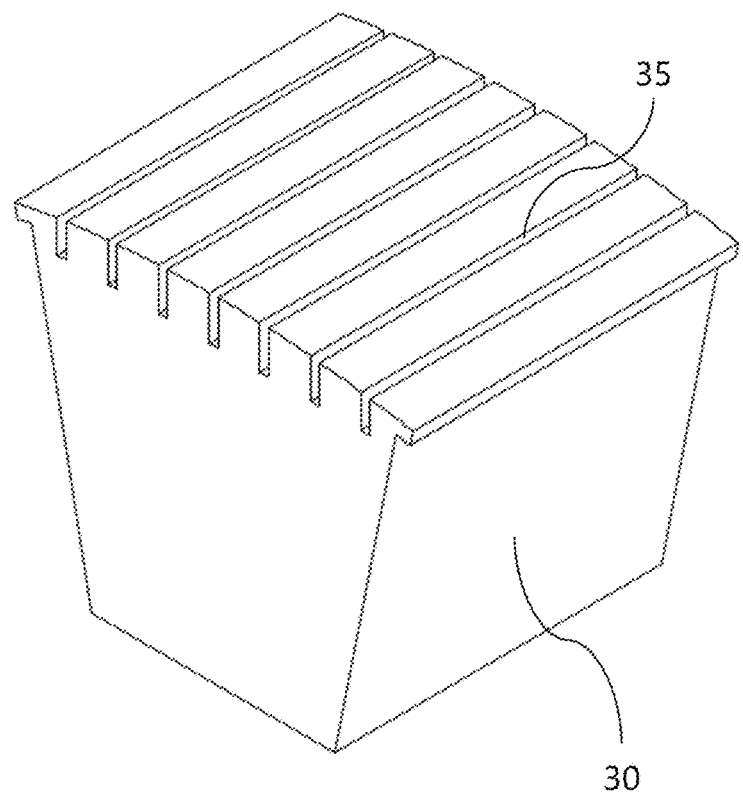
FIG. 22 shows a pole piece.

FIG. 22 shows a specific construction of the magnetic pole piece 30 made of solid electrically conductive material, which can have radial and/or axial (shown in the FIG. 22) slits on the face adjacent to the air gap (between permanent magnet rotor and stator). Such slits can break eddy current loops induced by air gap magnetic fields rotating asynchronously with respect to the permanent magnet rotor thus reducing power loss and subsequent heating of the permanent magnet rotor.

Width of the slits 35 should be minimal in order not to restrict flow of magnetic flux towards the air gap and cause excessive saturation of material between slits 35. Radial depth of slits depends on amplitude and frequency of the aforementioned asynchronous air gap fields. Deeper slits can more effective at reducing eddy current power loss but they can act as flux barriers for flux from circumferentially magnetised magnets.

The slits 35 can be cut into the magnetic pole piece 30 surface or manufactured by any other method which allows for minimal width.

Figure 23:
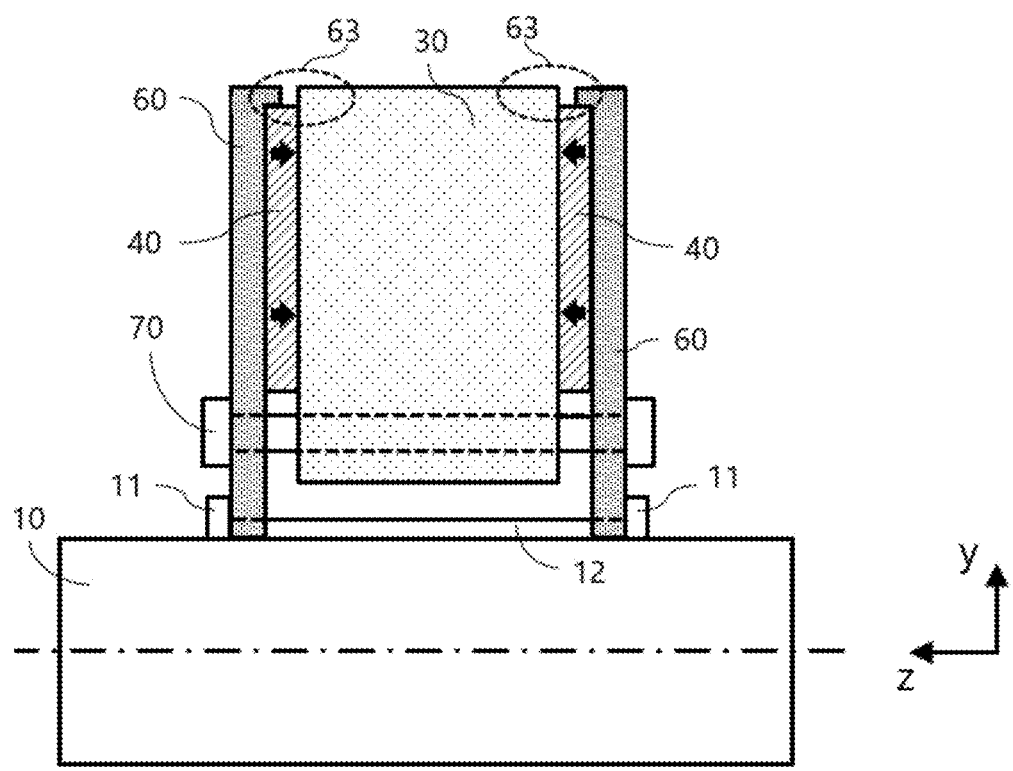
FIG. 23 is a view of the permanent magnet rotor cut along the z-axis and through the magnetic pole piece showing the shaft, magnetic pole piece, magnets providing flux in axial direction, magnetic end-plates and axial fastener.

FIG. 23 shows an embodiment of the present invention without the hub and comprises shaft 10, magnetic pole piece 30, magnets providing flux in axial direction 40 and magnetic end-plates 60.

Magnetic end-plates 60 with inner radius extending to shaft 10 having shoulders 11 to provide axial tightness to the magnetic end-plates 60 and hence constraining the other components. These magnetic end-plates 60 are made with ferromagnetic material having isotropic magnetic properties to provide return path for the magnetic flux generated by magnets providing flux in axial direction 40.

Important aspect to note here is the absence of rotor hub and the magnetic end-plates 60 are used to provide structural support between the shaft 10 and magnetic pole pieces 30 as well as the shaft 10 magnets providing flux in axial direction 40. Absence of parts made of magnetic material near the inner diameter of magnetic pole pieces 30 and magnets is beneficial since it reduces loss of magnetic flux due to leakage through the magnetic components. As a result, more of the useful flux is directed towards the air gap adjacent to stator which improves electromagnetic performance of a machine equipped with such permanent magnet rotor. In this embodiment, magnetic pole pieces 30 and magnets providing flux in axial direction 40 are mechanically constrained by magnetic end-plates 60 leaving large gap between them and the shaft 10. The gap acts as a flux barrier region and the larger it is the more effective it will be at reducing flux leakage. As a result, magnetic properties of the material used for the shaft 10 are of less importance.

An axial fastener 70 (shown as bolt, can also be tie bars or rivets) provides axial constraints to magnetic end-plates 60 and magnetic pole pieces 30. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 would need to be strong enough to provide axial tightness of active components of the permanent magnet rotor.

Magnetic end-plates 60 with axial extension 63 (lip) at the outer radius, covering the magnets providing flux in axial direction 40. This feature in the magnetic end-plates 60 provide radial constraints to the magnets providing flux in axial direction 40 against centrifugal forces. Since the magnetic end-plates 60 are made of magnetic material, the axial extension (protrusion) provides leakage path for magnetic flux generated by the magnets. If the magnetic end-plates 60 are made of mild steel, the axial extensions (protrusion) could be heat treated in order to reduce their relative permeability to one. Additionally, material with low conductivity (such as magnetic stainless steel) can be used in order to limit eddy current power loss.

A spline 12 type feature on the shaft 10 with the corresponding feature on the magnetic end-plates 60 for the circumferential constraint resulting in transfer of torque to the shaft 10.

A shoulder 11 type feature on the shaft 10 for axial placement of the active components.

An adhesive can be used at the interface between components to keep the assembly intact against centrifugal and axial forces.

The features shown in embodiment of FIG. 23 can also be used for two-shaft construction as shown in FIG. 4*b* and FIG. 5*b*.

Figure 24:
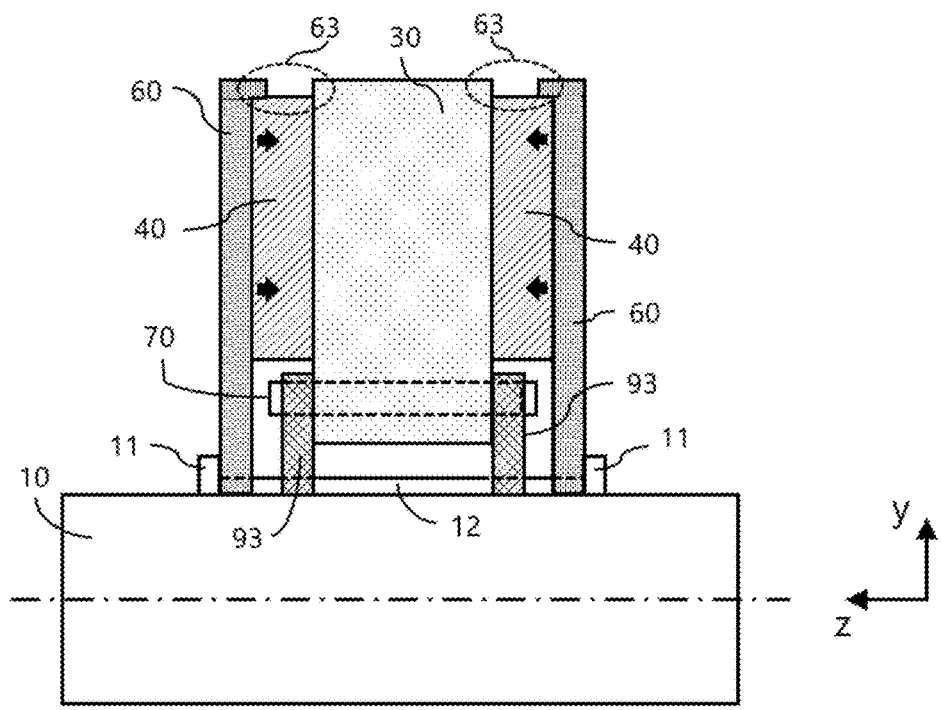
FIG. 24 is a view of the permanent magnet rotor cut along the z-axis and through the magnetic pole piece showing the shaft, magnetic pole piece, magnets providing flux in axial direction, magnetic end-plates, axial fastener and non-magnetic rings.

FIG. 24 shows an embodiment of the present invention without the hub and comprises shaft 10, magnetic pole piece 30, magnets providing flux in axial direction 40, non-magnetic rings 93 and magnetic end-plates 60.

Magnetic end-plates 60 with inner radius extending to shaft 10 having shoulders 11 to provide axial tightness to the magnetic end-plates 60 and hence constraining the other components. These magnetic end-plates 60 are made with ferromagnetic material having isotropic magnetic properties to provide return path for the magnetic flux generated by magnets providing flux in axial direction 40.

One or more axial bars or fasteners attach the magnetic pole pieces to non-magnetic material that forms part of the flux barrier region and the non-magnetic material comprises one or more rings 93. The magnetic pole pieces 30 and non-magnetic rings 93 comprise features to accommodate the fasteners. The non-magnetic rings 93 in combination with an axial fastener 70 (shown as bolt, can also be tie bars or rivets) provides radial constraints for magnetic pole pieces 30.

Alternative to using a fastener 70 is to use a stud such that it does not go all the way through the non-magnetic rings 93.

Important aspect to note here is the absence of rotor hub and the magnetic end-plates 60 provide structural support between the shaft 10 and magnets providing flux in axial direction 40. Absence of parts made of magnetic material near the inner diameter of magnetic pole pieces 30 and magnets is beneficial since it reduces loss of magnetic flux due to leakage through the magnetic components. As a result, more of the useful flux is directed towards the air gap adjacent to stator which improves electromagnetic performance of a machine equipped with such permanent magnet rotor. The gap acts as a flux barrier region and the larger it is the more effective it will be at reducing flux leakage. As a result, magnetic properties of the material used for the shaft 10 are of less importance.

Magnetic end-plates 60 with axial extension 63 (lip) at the outer radius, covering the magnets providing flux in axial direction 40. This feature in the magnetic end-plates 60 provide radial constraints to the magnets providing flux in axial direction 40 against centrifugal forces. Since the magnetic end-plates 60 are made of magnetic material, the axial extension (protrusion) provides leakage path for magnetic flux generated by the magnets. If the magnetic end-plates 60 are made of mild steel, the axial extensions (protrusion) could be heat treated in order to reduce their relative permeability to one. Additionally, material with low conductivity (such as magnetic stainless steel) can be used in order to limit eddy current power loss.

A spline 12 type feature on the shaft 10 with the corresponding feature on the magnetic end-plates 60 for the circumferential constraint resulting in transfer of torque to the shaft 10. This spline feature 12 can also be used for connection between the shaft 10 and non-magnetic rings 93.

A shoulder 11 type feature on the shaft 10 for axial placement of the active components.

An adhesive can be used at the interface between components to keep the assembly intact against centrifugal and axial forces.

The features shown in embodiment of FIG. 24 can also be used for two-shaft construction as shown in FIG. 4b and FIG. 5b.

Figure 25:
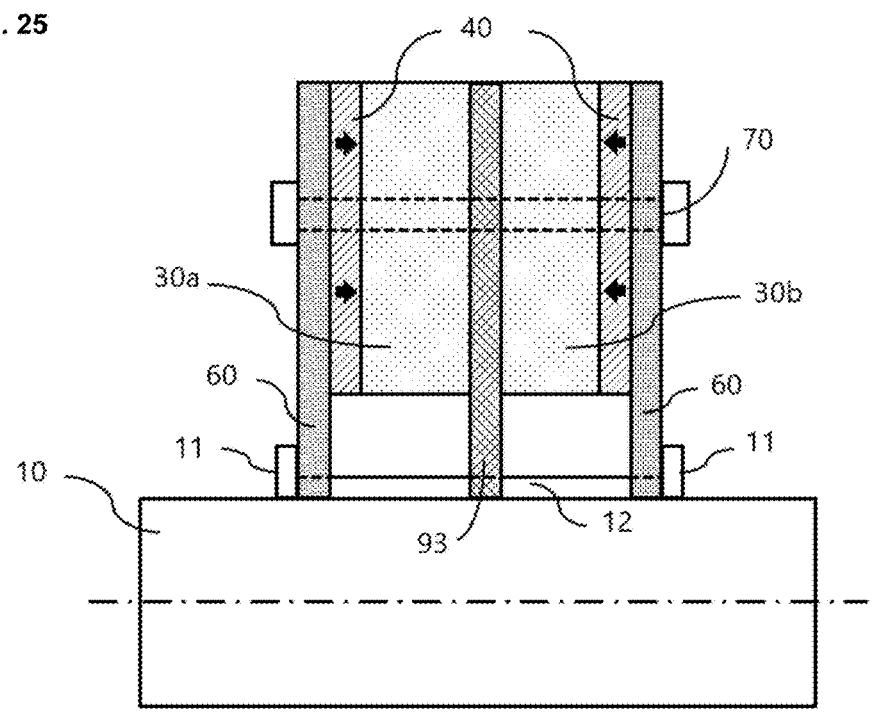
FIG. 25 is a view of the permanent magnet rotor cut along the z-axis and through the magnetic pole piece showing the shaft, magnetic pole piece, magnets providing flux in axial direction, magnetic end-plates, axial fastener and non-magnetic ring.

FIG. 25 shows an embodiment of the present invention without the hub and comprises shaft 10, magnetic pole piece 30, magnets providing flux in axial direction 40, non-magnetic ring 93 and magnetic end-plates 60. In this embodiment, the magnetic pole piece 30 is split into two parts (30a and 30b) across a plane perpendicular to rotor axis.

Magnetic end-plates 60 with inner radius extending to shaft 10 having shoulders 11 to provide axial tightness to the magnetic end-plates 60 and hence constraining the other components. These magnetic end-plates 60 are made with ferromagnetic material having isotropic magnetic properties to provide return path for the magnetic flux generated by magnets providing flux in axial direction 40.

A non-magnetic ring 93 is placed between the two halves (30a and 30b) of the pole piece 30. In combination with an axial fastener 70 (shown as bolt, can also be tie bars or rivets), the non-magnetic ring 93 provides radial constraints for magnetic pole pieces 30. Axial fastener 70, if made of electrically conductive material, could be a source of eddy current loss, hence, material with low conductivity can be used. In addition, axial fastener 70 together with end-plates 60 could form a cage similar to that used in rotors of induction machines, provided both components are made of electrically conductive material and are not electrically insulated from each other. While typically, the cage is of little benefit in permanent magnet synchronous machines and could be source of rotor eddy current losses, it is possible to use it for asynchronous starting of a motor equipped with the rotor or rotor oscillation damping.

Alternative to using a fastener 70 is to use a stud such that it does not go all the way through the magnetic end-plates 60. The advantage is simplification of design. In such a case, the shoulders 11 on shaft 10 would need to be strong enough to provide axial tightness of active components of the permanent magnet rotor.

Important aspect to note here is the absence of rotor hub and the magnetic end-plates 60 are used to provide structural support between the shaft 10 and magnetic pole pieces 30 as well as the shaft 10 magnets providing flux in axial direction 40. Absence of parts made of magnetic material near the inner diameter of magnetic pole pieces 30 and magnets is beneficial since it reduces loss of magnetic flux due to leakage through the magnetic components. As a result, more of the useful flux is directed towards the air gap adjacent to stator which improves electromagnetic performance of a machine equipped with such permanent magnet rotor. The gap acts as a flux barrier with high magnetic reluctance and the larger it is the more effective it will be at reducing flux leakage. As a result, magnetic properties of the material used for the shaft 10 are of less importance.

A spline 12 type feature on the shaft 10 with the corresponding feature on the magnetic end-plates 60 for the circumferential constraint resulting in transfer of torque to the shaft 10. This spline feature 12 can also be used for connection between the shaft 10 and non-magnetic ring 93 to assist with transmission of torque.

A shoulder 11 type feature on the shaft 10 for axial placement of the active components.

An adhesive can be used at the interface between components to keep the assembly intact against centrifugal and axial forces.

The features shown in embodiment of FIG. 25 can also be used for two-shaft construction as shown in FIG. 4b and FIG. 5b.

Figure 26:
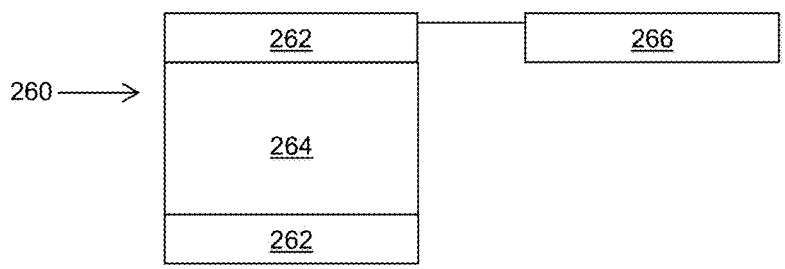
FIG. 26 is a diagrammatic representation of an electrical machine having a rotor assembly of the present invention.

FIG. 26 shows an electrical machine (260) comprising a cylindrical stator (262) having a winding comprising a number of coils, a rotor assembly (264) as disclosed above, and a power supply (266) providing electrical energy to the stator windings.

Magnetic Pole Piece—Material and Construction

Requirements on magnetic pole piece material and construction are 1) High relative permeability, 2) low electrical conductivity and 3) Structural strength.

The path of flux from magnets providing flux in axial direction and circumferentially magnetised magnets to the air gap is three dimensional. It is therefore better to use material with isotropic relative permeability. Solid materials such as mild steel or magnetic stainless steel are naturally isotropic.

While isotropic permeability is advantageous, anisotropic materials still could be used but their usage might result in reduced electromagnetic performance (lower air gap flux density) or increased cost (more magnet material needed to achieve required air gap flux density).

In order to limit ohmic loss, material used for magnetic pole pieces should have high electrical resistivity. Alternatively, highly electrically conductive materials can be segmented and segments insulated from each other in order to break eddy current loops and minimize power loss.

In practice, electrical steel laminations with layer on insulating material on each side are typically used for rotors of electrical machines as they have high relative permeability and low power loss due to eddy currents. However, laminated structures exhibit reduced relative permeability along the axis of lamination because layers of insulating material have relative permeability equal to 1 and behave like series of thin air gaps. In a typical electrical machine, plane of lamination coincides with the axis of rotation.

Soft magnetic composites (powdered ferromagnetic material bonded by a bonding agent) combine isotropic magnetic properties with low eddy current loss and are, therefore, suitable for pole piece material. However, they tend to be brittle.

Magnetic pole piece can be constructed as a two part assembly, where bottom part, called pole body, can be made of solid material while top part called pole shoe can be laminated or made of soft magnetic composite. The path of magnetic flux penetrating the pole shoe is mostly one dimensional (radial) and it, therefore, doesn't need to have isotropic properties. On the other hand, pole shoe is exposed to varying air gap fields and it is therefore beneficial to limit eddy currents induced by air gap fields. Pole body guides magnetic flux from magnets providing flux in axial direction and circumferentially magnetised magnets towards the pole shoe. Since the path of flux through the pole body is three dimensional, isotropic magnetic properties are beneficial.

Permanent Magnets—Material and Construction

Permanent magnet material, such as NdFeB or SmCo, is electrically conductive, therefore eddy currents can be induced by varying magnetic fields. Effective method of eddy current loss reduction is segmentation. Each of the magnets used in the permanent magnet rotor can consist of number of segments which are electrically insulted form each other. Extreme case of segmentation is where magnets consists of small particles bonded together by a bonding agent such as resin.

Magnets resistance to demagnetisation is expressed by coercive force. The higher the coercive force the harder it is to demagnetize a magnet, therefore magnet grades with high coercive force should be used. In addition, magnet edges parallel to the axis of magnetisation are at particular risk of partial demagnetisation, especially if they are surrounded by components made of magnetic materials. Non-magnetic spacers are effective at reducing field fringing near the edges (edges parallel to the axis of magnetisation) of the magnets since they create flux barrier between the magnets and other magnetic components.

The invention claimed is:

1. A permanent magnet rotor assembly having a plurality of magnetic poles, comprising the following components:
a plurality of magnetic pole pieces arranged in circular array, the magnetic pole pieces having circumferential gaps between them;
an array of circumferentially magnetised magnets placed in the circumferential gaps wherein the circumferentially magnetised magnets provide flux in a circumferential direction, wherein the circumferentially adjacent magnets are magnetised in opposite directions to each other;
magnetic end-plates having an axial position with respect to the circular array of magnetic pole pieces so that an axial gap exists between each magnetic end-plate and the magnetic pole pieces;
circular arrays of magnets providing flux in an axial direction placed in the axial gaps wherein circumferentially adjacent magnets in each array are magnetised in opposite directions to each other;
a shaft used to transmit torque between the rotor and a prime-mover in generation mode and between the rotor and a load in motor mode;
a flux barrier region having high magnetic reluctance between the (i) shaft and (ii) the magnetic pole pieces and the arrays of magnets; and
a fastener going through the magnetic end-plates, the magnets providing flux in an axial direction and the magnetic pole pieces,
wherein one of the end-plates and the corresponding array of magnets providing flux in an axial direction are located at each end of the rotor assembly;
wherein the magnetic end-plates connect the shaft to the rest of the rotor assembly.

2. The permanent magnet rotor assembly according to claim 1, wherein the flux barrier region comprises an air gap between (i) the shaft and (ii) the magnetic pole pieces, the circumferentially magnetised magnets and the magnets providing flux in axial direction.

3. The permanent magnet rotor assembly according to claim 1, wherein the shaft comprises two components, each of the two components connected directly to the magnetic end-plates on each side of the rotor, and wherein the flux barrier region comprises an air gap between (i) the shaft components and (ii) the magnetic pole pieces, the circumferentially magnetised magnets and the magnets providing flux in axial direction.

4. The permanent magnet rotor assembly according to claim 1, wherein the components comprise one or more of the following features:
an inner diameter of the magnetic end-plates is the same as an outer diameter of the shaft;
portions of the magnetic end-plates axially protruded to form lips in order to radially constrain the magnets providing flux in the axial direction and/or the magnetic pole pieces;
an axial thickness of the end-plates varies with radial position to accommodate the shape of the magnets providing flux in axial direction;
the magnetic end-plates have radial ribs at an angular location of the circumferentially magnetised magnets, wherein the circumferential width of the ribs is such that the ribs fit in gaps between the magnets providing flux in axial direction;
the magnetic end-plates have slots at an angular location of the circumferentially magnetised magnets on the face adjacent to the circumferentially magnetised magnets, and having an axial depth smaller than the axial thickness of the magnetic end-plates and an axial cross section to accommodate circumferentially magnetised magnets;
the magnetic end-plates have slots at an angular location of the magnets providing flux in axial direction, on the face adjacent to the magnets providing flux in axial direction, having axial depth smaller than the axial thickness of the magnetic end-plates and an axial cross section to accommodate the magnets providing flux in axial direction.

5. The permanent magnet rotor assembly according to claim 4, wherein one or more axially oriented clips or bands comprised of structurally strong material are installed around the rotor hub, magnetic end-plates, magnets providing flux in axial direction and magnetic pole pieces; and
one or more grooves or holes formed in the magnetic pole pieces, magnets, rotor hub and magnetic end-plates to accommodate the clips or bands.

6. An electrical machine comprising:
a cylindrical stator having a winding comprising a number of coils;
a rotor assembly according to claim 1;
a power supply providing electrical energy to the stator windings.

7. The permanent magnet rotor assembly according to claim 1, wherein the fastener is an axial fastener providing axial constraints to the magnetic end-plates, the magnets providing flux in axial direction and the magnetic pole pieces.

8. The permanent magnet rotor assembly according to claim 1, wherein the fastener provides radial and circumferential constraints to the magnets providing flux in axial direction and the magnetic end-plates.

9. The permanent magnet rotor assembly according to claim 1, wherein the fastener is one of a bolt, a tie bar and a rivet.

10. The permanent magnet rotor assembly according to claim 1, wherein the fastener is made of material with low conductivity.

11. The permanent magnet rotor assembly according to claim 1, comprising at least two fasteners that go through the magnetic end-plates, the magnets providing flux in axial direction and the magnetic pole pieces.

12. A permanent magnet rotor assembly having a plurality of magnetic poles, comprising the following components:
a plurality of magnetic pole pieces arranged in circular array, the magnetic pole pieces having circumferential gaps between them;

an array of circumferentially magnetised magnets placed in the circumferential gaps, wherein the circumferentially adjacent magnets are magnetised in opposite directions to each other;

magnetic end-plates having an axial position with respect to the circular array of magnetic pole pieces so that an axial gap exists between each magnetic end-plate and the magnetic pole pieces;

circular arrays of magnets providing flux in an axial direction placed in the axial gaps wherein circumferentially adjacent magnets in each array are magnetised in opposite directions to each other;

a shaft used to transmit torque between the rotor and a prime-mover in generation mode and between the rotor and a load in motor mode;

a flux barrier region having high magnetic reluctance between the (i) shaft and (ii) the magnetic pole pieces and the arrays of magnets; and a fastener going through the magnetic end-plates, the magnets providing flux in axial direction and the magnetic pole pieces, wherein one of the end-plates and the corresponding array of magnets providing flux in an axial direction are located at each end of the rotor assembly;

wherein the magnetic end-plates connect the shaft to the rest of the rotor assembly, the permanent magnet rotor assembly comprising an axial extension at an intermediate diameter of the pole-facing side of the magnetic end-plates, the axial extension providing radial support to the magnetic pole pieces and the magnets providing flux in axial direction at their inner diameter and constraining the magnetic pole pieces and the magnets providing flux in axial direction against rotation around the axial fastener.

13. The permanent magnet rotor assembly according to claim 12, wherein the axial extension is a lip.

* * * * *